US012800319B2

(12) United States Patent
Pegg et al.

(10) Patent No.: US 12,800,319 B2
(45) Date of Patent: Nov. 17, 2026

(54) SYSTEMS AND METHODS FOR DETECTING AND CORRECTING DIVERGED COMPUTER READABLE MAPS FOR ROBOTIC DEVICES

(71) Applicant: Brain Corporation, San Diego, CA (US)

(72) Inventors: Ian Stuart Pegg, San Diego, CA (US); Jonathon James Sather, San Diego, CA (US); Girish Bathala, San Diego, CA (US)

(73) Assignee: Brain Corporation, San Diego, CA (US)

( * ) Notice: Subject to any disclaimer, the term of this patent is extended or adjusted under 35 U.S.C. 154(b) by 182 days.

(21) Appl. No.: 18/512,711

(22) Filed: Nov. 17, 2023

(65) Prior Publication Data

US 2024/0168487 A1 May 23, 2024

Related U.S. Application Data

(60) Provisional application No. 63/426,465, filed on Nov. 18, 2022.

(51) Int. Cl.
*G01C 21/30* (2006.01)
*G05D 1/00* (2024.01)
(Continued)

(52) U.S. Cl.
CPC ........... *G01C 21/30* (2013.01); *G05D 1/0248* (2013.01); *G05D 1/027* (2013.01); *G05D 1/0274* (2013.01);
(Continued)

(58) Field of Classification Search
CPC ........ G05D 1/027; G05D 1/0248; G05D 1/24; G05D 1/2464; G01C 21/30; G06V 20/58
See application file for complete search history.

(56) References Cited

U.S. PATENT DOCUMENTS 5,111,401 A 5/1992 Everett, Jr. et al.
5,696,675 A 12/1997 Nakamura et al.
(Continued)

FOREIGN PATENT DOCUMENTS

EP 1240562 B1 6/2004
EP 2343615 B1 10/2018
(Continued)

OTHER PUBLICATIONS

Carlos Estrada, et al., Hierarchical SLAM: Real-Time Accurate Mapping of Large Environments, 21 IEEE Transactions on Robotics 588; Aug. 2005.
(Continued)

*Primary Examiner* — Christian Chace
*Assistant Examiner* — Richard Edwin Geist
(74) *Attorney, Agent, or Firm* — Pierson Ferdinand LLP; Sidharth Kapoor

(57) ABSTRACT

Systems and methods for detecting and correcting diverged maps for robotic devices include three scoring metrics that quantify map quality using different methods and properties of the map. The scoring metrics provide localized map quality measurements useful for determining diverged portions of the maps and provide metrics useful for correcting the maps.

18 Claims, 16 Drawing Sheets

(51) Int. Cl.
*G05D 1/24* (2024.01)
*G05D 1/246* (2024.01)
*G06V 20/58* (2022.01)

(52) U.S. Cl.
CPC ............. *G05D 1/24* (2024.01); *G05D 1/2464* (2024.01); *G06V 20/58* (2022.01)

(56) References Cited

U.S. PATENT DOCUMENTS

| | | | |
|---|---|---|---|
| 5,758,298 A | 5/1998 | Guldner | |
| 5,793,900 A | 8/1998 | Nourbakhsh et al. | |
| 5,793,934 A | 8/1998 | Bauer | |
| 6,667,592 B2 | 12/2003 | Jacobs et al. | |
| 7,170,252 B2 | 1/2007 | Maeki | |
| 7,502,065 B2 | 3/2009 | Nakahara | |
| 7,965,890 B2 | 6/2011 | Marcus et al. | |
| 8,185,239 B2 | 5/2012 | Teng et al. | |
| 8,300,890 B1 | 10/2012 | Gaikwad et al. | |
| 8,542,875 B2 | 9/2013 | Eswara | |
| 8,577,538 B2 * | 11/2013 | Lenser | G05D 1/0027 701/28 |
| 8,903,589 B2 | 12/2014 | Sofman et al. | |
| 8,918,241 B2 | 12/2014 | Chen et al. | |
| 8,948,913 B2 | 2/2015 | Choi et al. | |
| 8,954,191 B2 | 2/2015 | Yi et al. | |
| 9,076,214 B2 | 7/2015 | Tsutsumi | |
| 9,122,948 B1 | 9/2015 | Zhu et al. | |
| 9,174,672 B2 | 11/2015 | Zeng et al. | |
| 9,192,869 B2 | 11/2015 | Moriya | |
| 9,208,384 B2 | 12/2015 | Conwell et al. | |
| 9,216,745 B2 | 12/2015 | Beardsley et al. | |
| 9,233,472 B2 | 1/2016 | Angle et al. | |
| 9,286,810 B2 | 3/2016 | Eade et al. | |
| 9,304,001 B2 | 4/2016 | Park et al. | |
| 9,380,922 B2 | 7/2016 | Duffley et al. | |
| 9,400,501 B2 | 7/2016 | Schnittman | |
| 9,404,756 B2 | 8/2016 | Fong et al. | |
| 9,519,289 B2 | 12/2016 | Munich et al. | |
| 9,534,899 B2 | 1/2017 | Gutmann et al. | |
| 9,538,892 B2 | 1/2017 | Fong et al. | |
| 9,864,377 B2 | 1/2018 | Welty et al. | |
| 9,910,444 B2 | 3/2018 | Eade et al. | |
| 9,952,053 B2 | 4/2018 | Fong et al. | |
| 10,093,021 B2 | 10/2018 | Aghamohammadi et al. | |
| 10,209,063 B2 | 2/2019 | Anderson-Sprecher | |
| 10,383,497 B2 | 8/2019 | Han et al. | |
| 10,667,664 B2 | 6/2020 | Sheikh et al. | |
| 10,915,114 B2 * | 2/2021 | Ebrahimi Afrouzi | G06V 20/58 |
| 11,927,965 B2 | 3/2024 | Ebrahimi Afrouzi et al. | |
| 2004/0117079 A1 | 6/2004 | Hulden | |
| 2006/0188168 A1 | 8/2006 | Sheraizin et al. | |
| 2008/0059015 A1 | 3/2008 | Whittaker et al. | |
| 2008/0294338 A1 | 11/2008 | Doh et al. | |
| 2012/0121161 A1 | 5/2012 | Eade et al. | |
| 2015/0261223 A1 | 9/2015 | Fong et al. | |
| 2021/0294328 A1 * | 9/2021 | Dhayalkar | G06T 7/73 |
| 2024/0190462 A1 * | 6/2024 | Schwindt | B60W 60/001 |

FOREIGN PATENT DOCUMENTS

| | | | |
|---|---|---|---|
| JP | 3265212 B2 | 3/2002 |
| JP | 2009216600 A | 9/2009 |
| JP | 2009288930 A | 12/2009 |
| JP | 5769455 B2 | 8/2015 |
| KR | 10-2010-0027683 A | 3/2010 |
| KR | 101048098 B1 | 7/2011 |
| WO | 2011146259 A2 | 11/2011 |

OTHER PUBLICATIONS

Tim Bailey and Hugh Durrant-Whyte, Simultaneous Localization and Mapping (SLAM): Part II, IEEE Robotics & Optimization Magazine; Sep. 2006.

Seongsoo Lee and Sukhan Lee, Embedded visual SLAM: Applications for low-cost consumer robots, 20 IEEE Robotics & Automation Magazine 83; 2013.

J.A. Castellanos, J. Montiel, J. Neira, J.D Tardos, The SPmap: A probabilistic framework for simultaneous localization and map building, 15(5) IEEE Trans. Robotics and Automation 948-952; 1999.

J. Scholz, S. Chitta, B. Marthi, M. Likhachev, Cart Pushing with a Mobile Manipulation System: Towards Navigation with Moveable Objects, IEEE International Conference on Robotics and Automation 6115-6120; 2011.

Internet Archives, WayBackMachine; http://www.neatorobotics.com/buy.html; Catured date: Jan. 23, 2010.

How Waterloo became a world-class robotics hub—The Globe and Mail; https://www.theglobeandmail.com/report-on-business/rob-magazine/how-waterloo-became-a-world-class-robotics-hub/article29784283/; Accessed Mar. 15, 2025.

News Release, iRobot Enters the Smart Home with Roomba® 980 Vacuum Cleaning Robot, Date: Sep. 16, 2015.

News Release, iRobot Expands Connected Product Line with Roomba@ 960; Date: Aug. 4, 2016.

E. Eade, P. Fong and M. E. Munich, "Monocular graph SLAM with complexity reduction," 2010 IEEE/RSJ International Conference on Intelligent Robots and Systems, Taipei, Taiwan, 2010, pp. 3017-3024.

Internet Archives, WayBackMachine; http://www.neatorobotics.com/faq.html; captured Jan. 24, 2010.

Neato XV-11 Robotic All-Floor Vacuum System; 2009.

Neato XV-11™ Vacuum User's Guide; Jan. 30, 2010.

Chang, Ya-Chun and Yoshio Yamamoto. "On-line path planning strategy integrated with collision and dead-lock avoidance schemes for wheeled mobile robot in indoor environments." Ind. Robot 35 (2008): 421-434.

Internet Archives, WayBackMachine; http://www.robotreviews.com/reviews/review-of-the-neato-xv-11-the-roomba- killer; Catured date: Sep. 23, 2010.

Basic Research Series: Optical Information Technology State-of-the-Art Report; Publication date 1993.

Bernard Feverjon et al., A local based approach for path planning of manipulators with a high No. of degrees of freedom. Proceedings. 1987 IEEE International Conference on Robotics and Automation 4 (1987): 1152-1159.

Brett R. Fajen et al., A Dynamical Model of Visually-Guided Steering, Obstacle Avoidance, and Route Selection. International Journal of Computer Vision 54 (2003): 13-34.

Christoph Rosmann et al., Efficient Trajectory Optimization Using a Spares Model. 2013 Eur. Conf. on Mobile Robots; Sep. 2013.

Dave Ferguson et al., Planning Long Dynamically Feasible Maneuvers for Autonomous Vehicles, Int'l J. of Robotics Research, vol. 28(8); Jun. 26, 2009.

David G. Lowe, Object Recognition from Local Scale-Invariant Features; 1999.

Dieter Fox et al., The Dynamic Window Approach to Collision Avoidance, IEEE Robotics and Automation Magazine, vol. 4(1); Apr. 1997.

Francisco Amoros et al., Global Appearance Applied to Visual Map Building and Path Estimation Using Multiscale Analysis, Hindawi Publishing Corporation, Mathematical Problems in Engineering, vol. 2014 Article ID 365417; Jul. 22, 2014.

Gany Berkovic and Ehud Shafir, Optical Methods for Distance and Displacement Measurements; Sep. 11, 2012.

Handbook of Optical Systems, vol. 4: Survey of Optical Instruments; 2008.

Hani Safadi, Local Path Planning Using Virtual Potential Field, McGill University School of Computer Science; Apr. 18, 2007.

J.M. Rueger, Electronic Distance Measurement, 3rd Ed.; 1990.

J.M. Rueger, Electronic Distance Measurement, 4th Ed.; 1996.

Kazushi Nakazawa et al., Movement Control of Accompanying Robot Based on Artificial Potential Field Adapted to Dynamic Environments, Elec. Engin. in Japan, vol. 192; Feb. 2014.

Khalid Yousif et al., An Overview to Visual Odometry and Visual SLAM: Applications to Mobile Robotics, Intell. Ind. Syst. vol. 1, 289; Nov. 13, 2015.

(56) References Cited

OTHER PUBLICATIONS

Laurent Itti, Christof Koch, and Ernst Niebur, A Model of Saliency-Based Visual Attention for Rapid Scene Analysis; Nov. 1998.
Lina J. Karam, Nabil G. Sadaka, Rony Ferzli, and Zoran A. Ivanovski, An Efficient Selective Perceptual-Based Super-Resolution Estimator; Dec. 2011.
Lu and Milios, Globally Consistent Range Scan Alignment for Environment Mapping, Autonomous robots, 4 Autonomous robots 333-49 (1997).
Lu Yin et al., A New Potential Field Method for Mobile Robot Path Planning in the Dynamic Environments, Asian J. of Conti ol vol. 11(2); Mar. 2009.
Matthias Nieuwenhuisen et al., Predictive Potential Field-Based Collision Avoidance for Multicopters, Remote Sensing and Spatial Information Sciences, vol. XL-1; Sep. 4, 2013.
Mejdl Safran and Steven Haar, Arduino and Android Powered Object Tracking Robot; Nov. 27, 2012.
Oscar Montiel et al., Optimal Path Planning Generation for Mobile Robots Using Parallel Evolutionary Artificial Potential Field, J. Intell. Robot Sys.; Sep. 20, 2014.
Oussama Khatib, Real-Time Obstacle Avoidance for Manipulators and Mobile Robots Int'l J. of Robotics Research, vol. 5(1); 1986.
P. Payeur, Improving Robot Path Planning Efficiency with Probabilistic Virtual Environment Models. IEEE Int'l Conf on Virtual Environments; Jul. 2004.
Peter Biber and Wolfgang StraBer, nScan-Matching: Simultaneous Matching of Multiple Scans and Application to SLAM, Proceedings 2006 IEEE International Conference on Robotics and Automation, 2006.
Pierre Melchior et al., Robust Path Planning for Mobile Robot Based on Fractional Attractive Force. 2009 American Control Conf.; Jun. 2009.
Qian Jia & Xingsong Wang, An Improved Potential Field Method for Path Planning, 2010 Chinese Control and Decision Conference; 2010.
Qian Xu, Chaitali Chakrabarti, and Lina J. Karam, A Distributed Canny Edge Detector and its Implementation on FGPA; 2011.
Richard Szeliski, Image Alignment and Stitching: A Tutorial, Foundations and Trends in Computer vol. 2; 2006.
Sean Quinlan & Oussama Khatib, Elastic Bands: Connecting Path Planning and Control, IEEE Int'l Conference on Robotics and Automation; 1998.
Srenivas Varadarajan and Lina J. Karam, An Improved Perception-Based No. Reference Objective Image Sharpness Metric Using Iterative Edge Refinement; 2008.
Srenivas Varadarajan, Chaitali Chakrabarti, Lina J. Karam, and Judit Maitinez Bauza, A Distributed Psycho-Visually Motivated Canny Edge Detector; 2010.
Srenivas Varadarajan, Lina J. Karam, and Dinei Florencio, Background Recovery from Video Sequences Using Motion Parameters; 2009.
Stachniss et al., Springer Handbook of Robotics, Chapter 46: Simultaneous Localization and Mapping, Springer (2d ed.); Jan. 1, 2016.
Prassler et al., Springer Handbook of Robotics, Chapter 65: Domestic Robots, Springer (2d ed.); Jan. 1, 2016.
Suzuki and Abe, Topological Structural Analysis of Digitized Binary Images by Border Following; 1983.
Wang Tianmiao et al., Mobile Robot Control Based on Dynamic Potential, Chinese J. of Sys. Engin. & Elec. Vol. 3; Mar. 31, 1992.
Ya-Chun Chang & Yoshio Yamamoto, Path Planning of Wheeled Mobile Robot with Simultaneous Free Space Locating Capability, Int'l Serv. Robotics; Nov. 25, 2008.
Yong K. Hwang & Narenda Ahuja, A Potential Field Approach to Path Planning, IEEE Transactions on Robotics and Automation vol. 8(1); Feb. 1992.
Wolfgang Hess et al., Real-time loop closure in 2D Lidar Slam, 2016 IEEE International Conference on Robotics and Automation; May 16-21, 2016.
Zhenyu Wu et al., Collision Avoidance for Mobile Robots Based on Artificial Potential Field and Obstacle Envelope Modelling, Assembly Automation, vol. 36(3); Aug. 1, 2016.
Kaiqi Huang, Liangsheng Wang, Tieniu Tan, and Steve Maybank, A Real-Time Object Detecting and Tracking System for Outdoor Night Surveillance; 2008.
Subramanian Saravankumar et al., Multipoint potential field method for path planning of autonomous underwater vehicles in 3D space, Intel Serv Robots 2013; Oct. 6, 2013.
Javier Minguez et al., Abstracting Vehicle Shape and Kinematic Constraints from Obstacle Avoidance Methods, Autonomous Robots, vol. 20(1); Feb. 3, 2006.
Alan Conrad Bovik, Marianna Clark, Wilson S. Geisler, Multichannel Texture Analysis Using Localized Spatial Filters; Jan. 1990.
John Canny, A Computational Approach to Edge Detection, IEEE Transactions on Pattern Analysis and Machine Intelligence, vol. PAMI-8, No. 6; Nov. 1986.
Edwin B. Olson, Robust and Efficient Robotic Mapping, Massachusetts Institute of Technology; 2008.
Giorgio Grisetti, et al., Nonlinear Constraint Network Optimization for Efficient Map Learning, 10 IEEE Transactions on Intelligent Transportation Systems 428; Sep. 2009.
Edwin Olson, et al., Fast Iterative Alignment of Pose Graphs with Poor Initial Estimates, Proceedings of the 2006 IEE Conference on Robotics and Automation; May 2006.
John Folkesson and Henrik I. Christensen, Closing the Loop with Graphical SLAM 23 IEEE Transactions on Robotics 731; Aug. 2007.

* cited by examiner

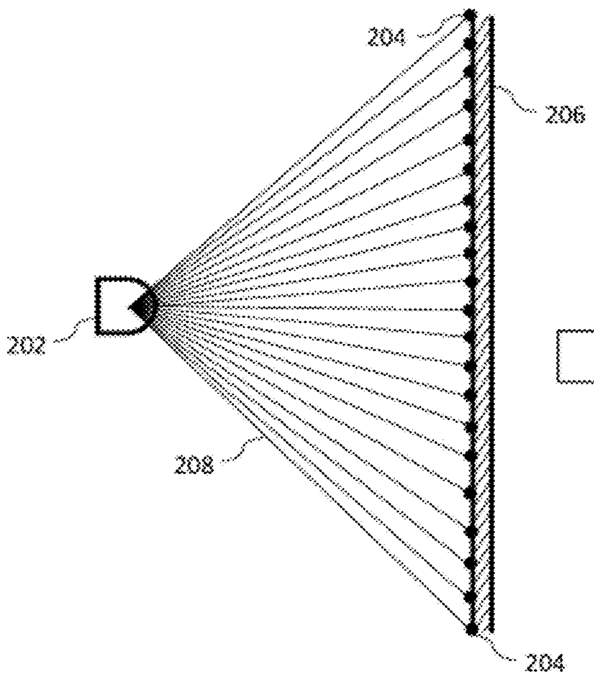
FIG. 2A(i)
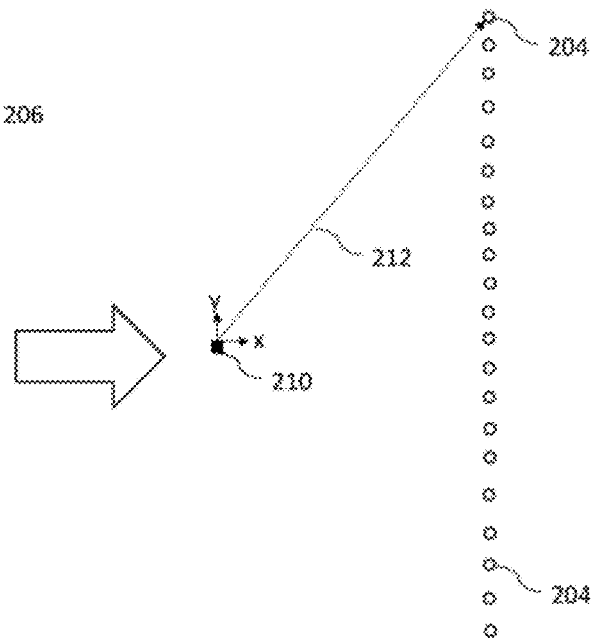
FIG. 2A(ii)

SYSTEMS AND METHODS FOR DETECTING AND CORRECTING DIVERGED COMPUTER READABLE MAPS FOR ROBOTIC DEVICES

CROSS-REFERENCE TO RELATED APPLICATIONS

This application claims the benefit of U.S. Provisional Application No. 63/426,465, filed Nov. 18, 2022, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application generally relates to robotics, and more specifically to systems and methods for detecting and correcting diverged computer readable maps for robotic devices.

SUMMARY

The foregoing needs are satisfied by the present disclosure, which provides for, inter alia, systems and methods for detecting and correcting diverged computer readable maps for robotic devices.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally be referred to autonomous vehicle or object that travels a route, executes a task, or otherwise moves automatically upon executing or processing computer readable instructions.

According to at least one non-limiting exemplary embodiment, a method for detecting erroneous or divergent maps produced by a robot is disclosed. The method comprises: receiving, via a processor coupled to a robot, a computer readable map based on data collected by one or more sensors during navigation of a route; calculating at least one scoring metric, wherein the at least one scoring metric indicates quality of the computer readable map as a function of location on the map; and providing the at least one scoring metric to a model to determine whether the computer readable map is diverged.

According to at least one non-limiting exemplary embodiment, the at least one scoring metric includes a footprint score, wherein the footprint score is determined based on the at least one processor superimposing a plurality of footprints of the robot at discrete locations along the route; determining that one or more pixels including only occupied pixels or undetected pixels lie within a respective boundary of the plurality of footprints; determining the footprint score based on the distance of the one or more pixels from the boundary, wherein individual pixels of the one or more pixels contribute a value to the footprint score proportional to their distance to the boundary.

According to at least one non-limiting exemplary embodiment, the at least one scoring metric includes a scan consistency score, the scan consistency score is determined based on the at least one processor simulating a scan taken by one or more sensors at a plurality of discrete locations along the route, wherein the scan includes a plurality of distance measurements between the one or more sensors and objects taken at a plurality of angles, the simulating of the scan comprises extending digital rays representing the distance measurements for the plurality of angles; determining a magnitude of penetration of the digital rays through occupied pixels or unknown pixels on the computer readable map; and determining a scan consistency score for each node along the route based on the magnitude of penetration at each node.

According to at least one non-limiting exemplary embodiment, the at least one scoring metric includes a scan alignment score, wherein the scan alignment score is determined based on the at least one processor selecting a first location along the route and a plurality of other discrete locations proximate to the first location; computing a first translational difference between the first location and each of the plurality of other discrete locations using data from one or both of LiDAR sensors and odometry IMUs; and determining the scan alignment score based on a difference between the first translational difference and a second translational distance, the second translational distance corresponding to the distance between the first location and the plurality of other discrete locations on the map.

According to at least one non-limiting exemplary embodiment, the method further includes the at least one processor projecting a scan at a second plurality of locations, each one of the second plurality of locations corresponds to the first translational difference corresponding to the plurality of other discrete locations; and determining free space overlap between the scan taken at the first location and each one of the second plurality of locations, wherein non-overlapping free space increases the scan alignment score.

According to at least one non-limiting exemplary embodiment, the at least one processor may comprise one or more processors of the robot or one or more processors on a server in communications with the robot.

According to at least one non-limiting exemplary embodiment, the method further includes scan matching, wherein scan matching comprises the at least one processor determining a transformation minimizing spatial discrepancies between nearest neighboring points of two successive scans.

Another aspect provides a robotic system, comprising at least one processor coupled to a robot configured to execute computer readable instructions to receive a computer readable map based on data collected by one or more sensors during navigation of a route; calculate at least one scoring metric, wherein the at least one scoring metric indicates quality of the computer readable map as a function of location on the map; and provide the at least one scoring metric to a model to determine whether the computer readable map is diverged.

According to at least one non-limiting exemplary embodiment, the at least one scoring metric includes a footprint score, wherein the footprint score is determined based on the at least one processor superimposing a plurality of footprints of the robot at discrete locations along the route; determining that one or more pixels including only occupied pixels or undetected pixels lie within a respective boundary of the plurality of footprints; and determining the footprint score based on the distance of the one or more pixels from the boundary, wherein individual pixels of the one or more pixels contribute a value to the footprint score proportional to their distance to the boundary.

According to at least one non-limiting exemplary embodiment, the at least one scoring metric includes a scan consistency score, wherein the scan consistency score is determined based on the at least one processor simulating a scan taken by one or more sensors at a plurality of discrete locations along the route, the scan includes a plurality of distance measurements between the one or more sensors and objects taken at a plurality of angles, the simulating of the scan comprises extending digital rays representing the distance measurements for the plurality of angles; determining a magnitude of penetration of the digital rays through occupied pixels or unknown pixels on the computer readable map; and a scan consistency score for each node along the route based on the magnitude of penetration at each node.

According to at least one non-limiting exemplary embodiment, the at least one scoring metric includes a scan alignment score, wherein the scan alignment score is determined based on the at least one processor selecting a first location along the route and a plurality of other discrete locations proximate to the first location; computing a first translational difference between the first location and each of the plurality of other discrete locations using data from one or both of LiDAR sensors and odometry IMUs; and determining the scan alignment score based on a difference between the first translational difference and a second translational distance, the second translational distance corresponding to the distance between the first location and the plurality of other discrete locations on the map.

According to at least one non-limiting exemplary embodiment, the at least one processor is further configured to project a scan at a second plurality of locations, each one of the second plurality of locations corresponds to the first translational difference corresponding to the plurality of other discrete locations; and determine free space overlap between the scan taken at the first location and each one of the second plurality of locations, wherein non-overlapping free space increases the scan alignment score.

According to at least one non-limiting exemplary embodiment, the at least one processor coupled to the robot executes computer readable instructions to perform scan matching, wherein scan matching comprises the at least one processor determining a transformation minimizing spatial discrepancies between nearest neighboring points of two successive scans.

Another aspect provides a non-transitory computer readable storage medium having a plurality of instructions stored thereon which, when executed by at least one processor coupled to a robot, configure the at least one processor to receive a computer readable map based on data collected by one or more sensors during navigation of a route; calculate at least one scoring metric, wherein the at least one scoring metric indicates quality of the computer readable map as a function of location on the map; and provide the at least one scoring metric to a model to determine whether the computer readable map is diverged.

According to at least one non-limiting exemplary embodiment, the at least one scoring metric includes a footprint score, wherein the footprint score is determined based on the at least one processor superimposing a plurality of footprints of the robot at discrete locations along the route; determining that one or more pixels including only occupied pixels or undetected pixels lie within a respective boundary of the plurality of footprints; and determining the footprint score based on the distance of the one or more pixels from the boundary, wherein individual pixels of the one or more pixels contribute a value to the footprint score proportional to their distance to the boundary.

According to at least one non-limiting exemplary embodiment, the at least one scoring metric includes a scan consistency score, wherein the scan consistency score is determined based on the at least one processor simulating a scan taken by one or more sensors at a plurality of discrete locations along the route, the scan includes a plurality of distance measurements between the one or more sensors and objects taken at a plurality of angles, the simulating of the scan comprises extending digital rays representing the distance measurements for the plurality of angles; determining a magnitude of penetration of the digital rays through occupied pixels or unknown pixels on the computer readable map; and determining a scan consistency score for each node along the route based on the magnitude of penetration at each node.

According to at least one non-limiting exemplary embodiment, the at least one scoring metric includes a scan alignment score, wherein the scan alignment score is determined based on the at least one processor selecting a first location along the route and a plurality of other discrete locations proximate to the first location; computing a first translational difference between the first location and each of the plurality of other discrete locations using data from one or both of LiDAR sensors and odometry IMUs; and determining the scan alignment score based on a difference between the first translational difference and a second translational distance, the second translational distance corresponding to the distance between the first location and the plurality of other discrete locations on the map.

According to at least one non-limiting exemplary embodiment, the at least one processor is further configured to project a scan at a second plurality of locations, each one of the second plurality of locations corresponds to the first translational difference corresponding to the plurality of other discrete locations; and determine free space overlap between the scan taken at the first location and each one of the second plurality of locations, wherein non-overlapping free space increases the scan alignment score.

According to at least one non-limiting exemplary embodiment, wherein the at least one processor is further configured to perform scan matching, wherein scan matching comprises the at least one processor determining a transformation minimizing spatial discrepancies between nearest neighboring points of two successive scans.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 2A(*i-ii*) illustrate a time-of-flight light detection and ranging sensor and a point cloud produced therefrom in accordance with some embodiments of this disclosure.

Figure 1A:
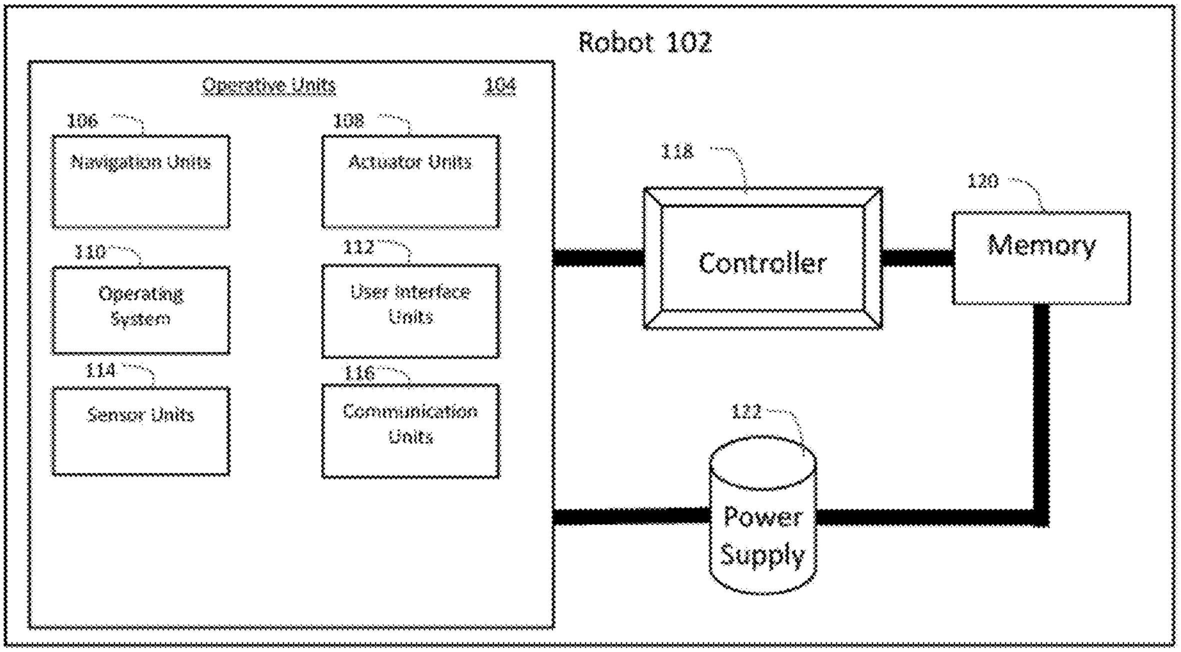
FIG. 1A is a functional block diagram of a robot in accordance with some embodiments of this disclosure.

All Figures disclosed herein are © Copyright 2023 Brain Corporation. All rights reserved.

DETAILED DESCRIPTION

Currently, many robots operate using computer readable maps which represent the physical environment around them. These maps are constructed using data from various sensors and internal monitoring units of the robots, each of which are subject to various errors, drift, biases, faulty calibration, and other issues. To represent the environment more accurately on the map, the processors of the robots aggregate not only sensory data but other constraints. For instance, to determine how far a robot has traveled in a straight line, data from a gyroscope, encoder, and light-detection and ranging sensor ("LiDAR") may be used. Each of these instruments may produce a slightly different value for the translation due to the imperfections (e.g., noise, bias, drift, etc.). Accordingly, the processor must account for the differing measurements and infer a most likely value for its translation. Other constraints may also be implemented. For instance, loop closures, or points along a route visited more than once by the robot, may constrain the inferences by ensuring these points are at the same location on the map. Additional constraints may be feature-based, wherein a robot seeing a feature at two or more locations can infer its position relative to that feature. Inferring a most likely value of a parameter, such as the locations of objects/the robot on the map, using imperfect data and various constraints may be referred to herein as optimization. For robots with well-tuned sensors navigating short routes, optimization of the maps is minimal. However, optimization processes for maps created by robots with many sensors (difficult to calibrate) navigating long routes (subject to odometry drift) in feature-poor environments (difficult to constrain) may fail to accurately represent the environment, thereby producing a diverged map. These diverged maps may cause, for example, a robot to think it is colliding with an object or stuck when, in the physical environment, it is able to move. Divergent map detection typically involves identifying many patterns which for humans are quite intuitive, wherein a human could look at most maps and immediately tell if they are diverged due to our familiarity with 3-dimensional space. However, for many robots, each producing unique maps of their unique environments, human review may become costly. Accordingly, there is a need in the art for systems and methods which automatically detect diverged maps produced by robots as well as correct them to be usable by the robots.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for detecting and correcting diverged computer readable maps for robotic devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAY® vehicles etc.), trailer movers, vehicles, and the like. Robots may also include any autonomous and/or semi-autonomous machine for transporting items, people, animals, cargo, freight, objects, luggage, and/or anything desirable from one location to another.

As used herein, drift refers to an accumulation of an error over a time from a sensor unit or instrument. Drift is typically found in instruments which rely on integration of a signal over time, including gyroscopes, accelerometers, and the like, wherein variance in the integration intervals causes a small, yet compounding error to be propagated which may eventually grow to being substantial. For instance, many gyroscopes suffer from drift, primarily along the yaw axis due to the lack of reference (gravity) to correct errors with respect to, which causes errors to accumulate and grow over time. This is particularly impactful for robots operating on flat surfaces (e.g., floors) that move in 2-dimensional space and turn about the yaw axis. In the case of gyroscopes, drift may be accounted for by nulling any sensed motion when it is known the gyroscope is idle; however for robots 102 fully stopping in the middle of a task may be undesirable.

As used herein, a feature may comprise one or more numeric values (e.g., floating point, decimal, a tensor of values, etc.) characterizing an input from a sensor unit 114 including, but not limited to, detection of an object, the object itself, portions of the object, parameters of the object (e.g., size, shape color, orientation, edges, etc.), an image as a whole, portions of the image (e.g., a hand of a painting of a human), color values of pixels of an image, depth values of pixels of a depth image, brightness of an image, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input. For example, a bottle of soap on a shelf may be a feature of the shelf, wherein a yellow price tag may be a feature of the bottle of soap and the shelf may be a feature of a store environment. The amount of soap bottles sold may be a feature of the sales environment.

As used herein, network interfaces may include any signal, data, or software interface with a component, network, or process including, without limitation, those of the Fire Wire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C #, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enable automatic detection of diverged maps; (ii) provide scoring metrics which are location-specific to indicate where on a map it began to diverge; and (iii) enable models to correct for diverged maps via reducing or minimizing the scoring metrics. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator units 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices or processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"). Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on-board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. In yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data to facilitate their ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 may include at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find its position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; and rotate or repose cameras and sensors. According to exemplary embodiments, actuator unit 108 may include systems that allow movement of robot 102, such as by motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet systems, piezoelectric systems (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 and may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"). Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables. Universal Serial Bus ("USB"), Fire Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"). Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or by plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
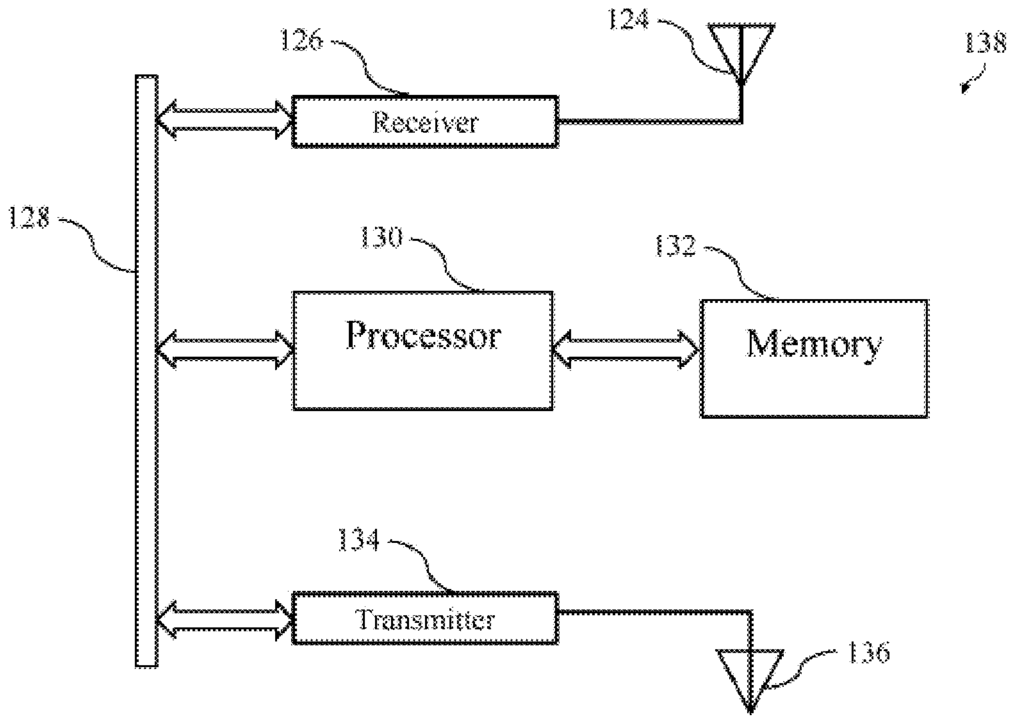
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions for the processor 130 to execute the specialized algorithms. As illustrated in FIG. 1B, memory 132 may comprise some, none, different, or all the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components-receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others, Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

FIG. 2A(*i-ii*) illustrates a planar light detection and ranging ("LiDAR") sensor 202 coupled to a robot 102, which collects distance measurements to a wall 206 along a measurement plane in accordance with some exemplary embodiments of the present disclosure. Planar LiDAR sensor 202, illustrated in FIG. 2A(*i*), may be configured to collect distance measurements to the wall 206 by projecting a plurality of beams 208 of photons at discrete angles along a measurement plane and determining the distance to the wall 206 based on a time of flight ("ToF") of the photons leaving the LiDAR sensor 202, reflecting off the wall 206, and returning to the LiDAR sensor 202. The measurement plane of the planar LiDAR 202 comprises a plane along which the beams 208 are emitted which, for this exemplary embodiment illustrated, is the plane of the page.

Individual beams 208 of photons may localize respective points 204 of the wall 206 in a point cloud, the point cloud comprising a plurality of points 204 localized in 2D or 3D space as illustrated in FIG. 2(*ii*). The points 204 may be defined about a local origin 210 of the sensor 202. Distance 212 to a point 204 may comprise half the time of flight of a photon of a respective beam 208 used to measure the point 204 multiplied by the speed of light, wherein coordinate values (x, y) of each respective point 204 depends both on distance 212 and an angle at which the respective beam 208 was emitted from the sensor 202. The local origin 210 may comprise a predefined point of the sensor 202 to which all distance measurements are referenced (e.g., location of a detector within the sensor 202, focal point of a lens of sensor 202, etc.). For example, a 5-meter distance measurement to an object corresponds to 5 meters from the local origin 210 to the object.

According to at least one non-limiting exemplary embodiment, sensor 202 may be illustrative of a depth camera or other ToF sensor configurable to measure distance, wherein the sensor 202 being a planar LiDAR sensor is not intended to be limiting. Depth cameras may operate similarly to planar LiDAR sensors (i.e., measure distance based on a ToF of beams 208); however, depth cameras may emit beams 208 using a single pulse or flash of electromagnetic energy, rather than sweeping a laser beam across a field of view. Depth cameras may additionally comprise a two-dimensional field of view rather than a one-dimensional, planar field of view.

According to at least one non-limiting exemplary embodiment, sensor 202 may be illustrative of a structured light LiDAR sensor configurable to sense distance and shape of an object by projecting a structured pattern onto the object and observing deformations of the pattern. For example, the size of the projected pattern may represent distance to the object and distortions in the pattern may provide information of the shape of the surface of the object. Structured light sensors may emit beams 208 along a plane as illustrated or in a predetermined pattern (e.g., a circle or series of separated parallel lines).

Figure 2B:
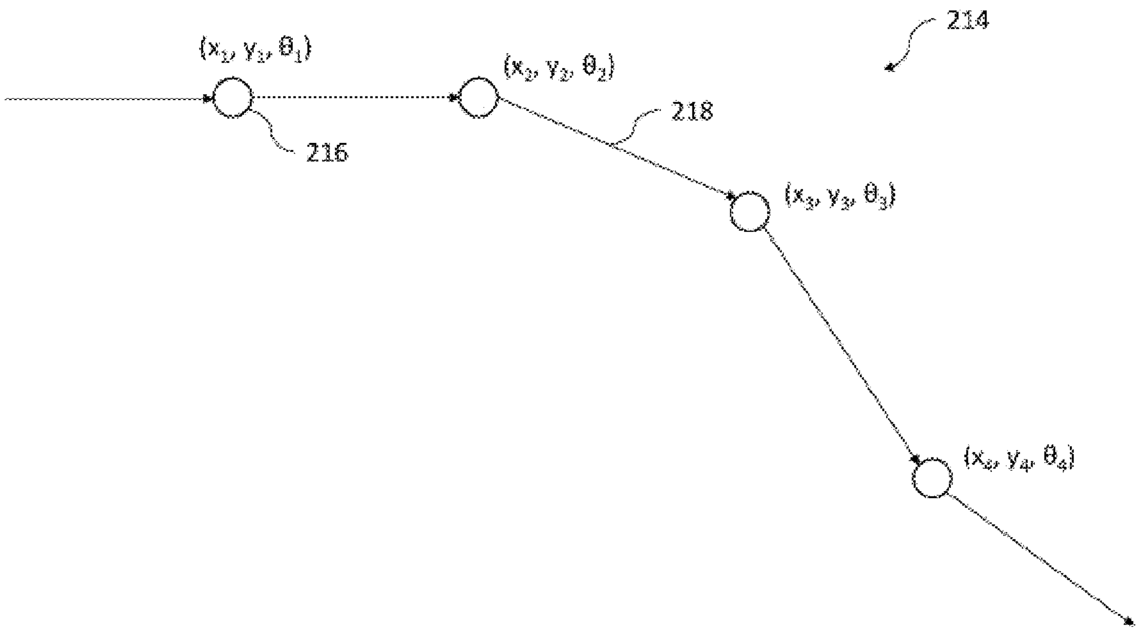
FIG. 2B illustrates a route and components thereof in accordance with some embodiments of this disclosure.

FIG. 2B illustrates a route 214 and components thereof, in accordance with the exemplary embodiments of this disclosure. The route 214 comprises a plurality of nodes 216, where each node may denote a state for the robot 102 to reach. The state for each node 216 may include, for two-dimensional space such as a bird's eye view, (x, y, θ) location and orientation. In some embodiments, additional parameters may be included for each node 216 such as, but not limited to, velocity, acceleration, and/or states of actuatable features of the robot 102 (e.g., a vacuum being on/off for a vacuuming robot 102). Alternatively, the controller 118 may interpolate between locations ($x_n$, $y_n$, $\theta_n$) and ($x_{n+1}$, $y_{n+1}$, $\theta_{n+1}$) given a time constraint to travel from one node 216 to the next to calculate a velocity when traveling between node n and node n+1.

For three-dimensional space, such as aquatic robots or drones, the states for each node 216 may include (x, y, z, yaw, pitch, roll) state variables. Additionally, based on the functions of the robot 102, certain states of actuatable features may be added to denote the tasks to be performed by the robot 102. For instance, if the robot 102 is an item transport robot, additional state parameters which denote, e.g., "drop off object" and "pick up object" may be utilized. Other states may include the state of light sources on the robot 102, states of joints of a robotic arm, states of a vacuum for floor cleaning robots, and the like.

Each node 216 is connected to previous and subsequent nodes 216 via a link 218. Links 218 may denote a shortest path from one node 216 to the next node 216. Typically, the nodes 216 are spaced close enough such that the links 218, which comprise straight-line approximations, are sufficiently small to enable smooth movement even through turns. Other methods of non-linear interpolation may be utilized; however, such methods may be computationally taxing to calculate in real time and may or may not be preferred for all robots 102.

The nodes 216 denote a location of the robot 102 in the environment and exist on a computer readable map of the environment. The robot 102 may be defined on the map via a footprint, corresponding to the size/shape occupied by the robot 102 in the physical world, wherein the footprint includes a dimensionless origin point. The origin point defines the dimensionless location of the robot 102 in space. A transform is stored in memory 120 (e.g., specified by a manufacturer of the robot 102) and/or, in some embodiments, continuously updated (e.g., using calibration methods) between the robot origin and sensor origins 210 for each sensor of the robot 102, thereby enabling the controller 118 to translate a, e.g., 5-meter distance measured by a sensor 202 to an object into a distance from the robot 102 and/or location in the physical space.

According to at least one non-limiting exemplary embodiment, the nodes 216 and links 218 therebetween are configured to reflect a user-demonstrated path. For instance, an operator may drive, push, lead, or otherwise move a robot 102 through a path. Navigation units 106 and sensor units 114 may provide data to the controller 118 to enable it to track the motions effected by the operator and sense the physical environment to construct a computer readable map.

Figure 3I:
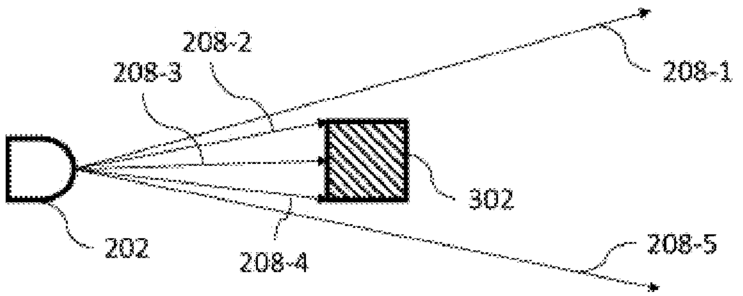
FIGS. 3(*i-ii*) depicts a construction of a partial computer readable map including mapping of free space, occupied space, and unknown space, according to an exemplary embodiment.
Figure 3:
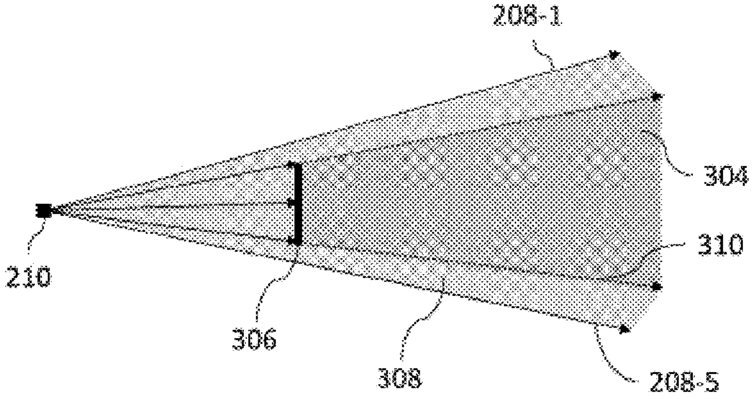

FIGS. 3(*i-ii*) illustrate three states pixels that may exist in a computer readable map in accordance with some exemplary embodiments of this disclosure. As shown in this figure, a computer readable map may comprise a 2-dimensional top-down view of the environment and comprise a plurality of pixels. In some embodiments, computer readable maps may be three dimensional and comprise voxels. The pixels of the computer readable map are intended to represent the surrounding environment of a robot 102 such that a controller 118 of the robot 102 may plan routes, execute tasks, and perform other functions without colliding with objects using the map. The pixels of the map may take one of three states: (i) free space/empty, (ii) occupied, or (iii) unknown. A free space pixel on the map represents a region of space that is free from objects. An occupied pixel comprises a region of space that is occupied by an object, as can be sensed by sensors 202 for example. An unknown pixel corresponds to a region of space in which no measurements are taken.

FIG. 3(*i*) illustrates a sensor 202 collecting distance measurements of a surrounding environment, which includes a box 302, by emitting beams 208. In the illustration, five beams 208 are shown for simplicity, however it is appreciated that many LiDAR sensors, depth cameras, etc., emit far more beams 208. The beams 208-1 and 208-5 are not incident upon the object 302 and travel into the environment and, due to the lack of other objects, never reflect to the sensor 202. Thus, no distances are recorded at these angles. Beams 208-2, 208-3, and 208-4 are incident upon the object 302 and reflect back to the sensor 202, yielding a distance measurement.

FIG. 3(*ii*) illustrates the resulting computer readable map based on the scan depicted in FIG. 3(*i*). To detect free space 308 pixels, the controller 118 may trace the paths of beams 208 emitted from the sensor origin 210 and, for every pixel the traced path passes through, the pixels are marked as free space 308. Since no return measurement was detected, it can be assumed that beams 208-1, 208-5 traveled to the maximum range of the sensor without detecting an object in their path, thus all pixels along their paths up until the maximum range are considered free space 308 and denoted in light grey.

Beams 208-2, 208-3, and 208-4 are incident upon the object 302 and therefore localize its surface nearest the sensor 202 at a distance corresponding to the measured distance by the sensor 202. Beams 208 do not travel into objects, so only the closest surface is localized. The closest surface is shown in dark black comprising occupied pixels 306. Since the top, bottom and rightmost boundaries (as illustrated in the figure) of the object 302 are not sensible from the perspective of sensor 202, the controller 118 cannot label the other edges as occupied, nor can it identify the internal space defined by these boundaries as occupied. Rather, the area behind the occupied segment 306 is denoted with unknown 304 pixels. In some embodiments, the entire map may be initialized to unknown space 304 to define the region of unknown space 304 illustrated in FIG. 3(*ii*). In some embodiments, controller 118 may extend digital rays 310 along the paths of rays 208-2, 208-3, 208-4 beyond the location where the corresponding beams reflect off an object (i.e., beyond occupied pixels 306) to map the area behind the surface as unknown space 304 by marking every pixel passed by the digitally extended rays as unknown space 304.

Pixel states may change based on a set of priorities. An unknown pixel 304 may be changed to an occupied pixel 306 or free space pixel 308 if a new measurement is taken that either senses an object at the location of the pixel, thereby changing the unknown pixels 304 to an object pixel 306, or a traced ray (e.g., 208-1, 208-5) extends through the unknown pixel 304, changing the unknown pixel 304 to free space 308. An occupied pixel 306 may be changed to a free space pixel if a ray 208 extending from the sensor origin 210 to an object passes through the occupied pixel 306 (e.g., upon viewing the occupied pixel from a different perspective). An occupied pixel 306 may also be changed to free space 308 if a path of a ray which corresponds to no distance measurement (e.g., 208-1, 208-5) travels through the occupied pixel 306. In some embodiments, free space pixels 308 may be reverted to unknown pixels after a threshold time to require the robot 102 to plan its paths only in free space which it has measured as free space recently.

One skilled in the art may appreciate that computer readable maps for robots 102 may not perfectly represent an environment in which the robot 102 operates, while still being usable for the robot 102 to complete its tasks. For instance, small errors in a location of an object may be present; however, unless the robot 102 is required to interact with or navigate around the object the errors may not cause a substantial issue to arise. In other instances, a pixel that should be classified as occupied by the boundary 306 of object 302 may be misclassified as free space. However, the surrounding pixels properly classified as occupied may be sufficient to cause the robot to consider boundary 306 to be in an occupied state despite a small number of pixels classified as free space. Accordingly, a map as used herein is considered diverged if the robot 102 does not accurately reflect the physical environment and/or the robot 102 is unable to perform its functions using the map. Various causes for map divergences are contemplated herein, none of which are intended to be limiting. A common error may arise from improper calibration of one or more sensors which, if undetected, could propagate errors through a map, as will be discussed below. Improper sensory calibration may cause errors in robot localization, which may further delocalize objects on the map. Another common source for map divergences is optimization of the computer readable map which attempts to infer, using limited sensory data, the proper locations/positions of objects on the map by aggregating multiple measurements (which could be prone to calibration errors). Many feature-to-feature alignments, some of which are discussed herein, used to correct mapping errors can fail to determine a proper solution in environments with few features (e.g., many repeating identical hallways or aisles, e.g., in a grocery store). Lastly, drift in odometry may cause a map to diverge due to an accumulation of error which, if left unaccounted for, would accumulate localization errors and propagate them through a map. In some instances, portions of a diverged map may be usable while other portions of the map are unusable, thereby making the entire map unusable.

Figure 4:
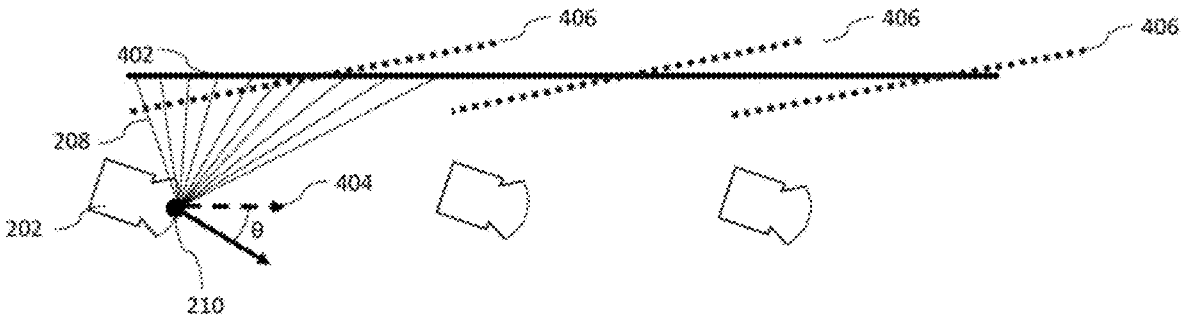
FIG. 4 depicts construction of a computer readable map using a poorly calibrated sensor, according to an exemplary embodiment.

FIG. 4 illustrates a sensor 202 of a robot 102 (not shown) collecting measurements of a flat surface 402 while the robot 102 navigates, according to an exemplary embodiment. The sensor 202 includes a rotational error in its position of θ degrees, as shown by segments 404 extending from its sensor origin 210. The error has been greatly exaggerated for illustrative clarity, though it is appreciated that typical calibration errors are on the order of a few degrees or less. It can be assumed that no calibration checks are performed at this instance, and accordingly the controller 118 will presume the sensor is in its correct orientation 404 as shown. Due to the unaccounted-for error in calibration θ, the sensor 202 emits beams 208 which are incident upon the surface 402. Based on the length/distances measured by the beams 208, and assuming the sensor 202 is in its default (i.e., calibrated) position, the controller 118 maps a segment 406 of the surface 402 as shown. Each subsequent scan may also contain this angular tilt in the sensed segments 406 of the surface 402.

Various other calibration errors may also be present which cause segments 406 to not properly represent the true position of the surface 402. For instance, a translational error downward on the page away from surface 402 in the sensor 202 position may cause the distances measured by beams 208 to be larger, and therefore localize segments 406 to be further from the sensor 202/robot 102. In some instances, such as for ToF sensors, ghosts may appear due to reflections, glare, and other environmental conditions. For instance, a LiDAR sensor 202 with beams 208 incident upon a reflective surface will not localize said surface and may instead localize another object upon a beam 208 reflecting off the mirror, reflecting off the object, and back to the sensor 202, wherein the sensor 202 does not know a reflection occurred and cannot account for the change in beam path. Accordingly, the sensor 202 localizes a point 204 based on the ToF of the beam 208 while assuming the beam 208 traveled uninhibited in its emitted direction. The result would erroneously localize the other object at a distance and location based on the ToF, including the longer reflection path, and along the original emitted angle of the beam. Other environmental conditions such as excessive white lighting may drown out return signals, causing return signals to be unreadable or read incorrectly.

The positional errors in the localized segments 406 of surface 402 may not be materially impactful as the robot 102 navigates at its current position. For instance, the segments 406 may not protrude enough to contact the robot 102 body. However, often robots 102 navigate to a same location multiple times, wherein these protruding segments 406 may contact the robot 102 on a computer readable map. It is appreciated that the segments 406 are digital representations of where the controller 118 perceives surface 402 to be, wherein the robot's position intersecting with these segments 406 on the computer readable map does not necessarily involve physical contact.

Figure 5:
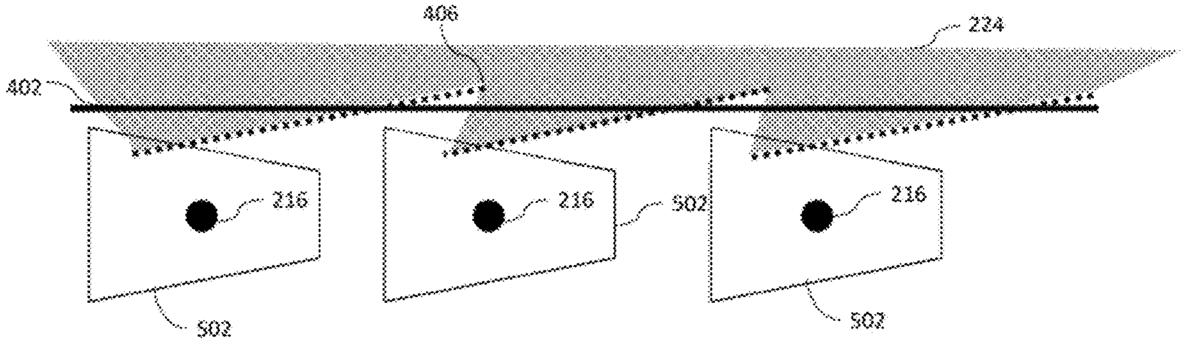
FIG. 5 depicts calculation of a footprint score using a computer readable map, according to an exemplary embodiment.

A first map divergence scoring metric, referred to hereinafter as a footprint score, is discussed next in FIG. 5, wherein the robot 102 has produced a map using data collected in FIG. 4, according to an exemplary embodiment. That is, the segments 406 shown are not necessarily measurements taken while the robot 102 is at the locations illustrated by footprints 502, and footprints 502 may be digital representations of the area occupied by the robot 102 at each node 216 on the map. The footprints 502 shown comprise digital representations of the robot 102 on the computer readable map, wherein the controller 118 may overlay the footprints 502 for each route node 216 while the robot 102 is at a different physical location. The nodes 216 shown are not the same nodes used to sense surface 402 and may correspond to a different segment of the route, wherein the robot 102 is navigating closer to the surface 402. Using the distance data collected in FIG. 4, the robot 102 is in "contact" with portions of the previously measured segments 406 as it navigates to three nodes 216 shown. That is, the controller 118 perceives that the footprint 502 of the robot occupies the same coordinates as portions of segments 406. As shown, the segments 406 penetrate the footprints 502 of the robot 102 at the three points 216 illustrated. Additionally, some pixels comprising an unknown state 304 may also penetrate the robot 102 footprint 502 which, in the physical world, is nonsensical. Accordingly, the footprint score may be a weighted summation of the number of occupied pixels 306 (i.e., segments 406) and unknown pixels 304 which penetrate the robot 102 footprint, wherein added weight may be provided based on the penetration depth of these pixels. The footprint score may be calculated for every route node 216 along the route. Accordingly, the footprint score may be expressed as:

$$S_{fp} = \sum_{n=1}^{N} \sum_{p=1}^{P} A * N(F) + B * d(p_{unknown}, p_{occupied}, F) \quad \text{(Eqn. 1)}$$

wherein N is the number of route nodes 216, P is the total pixels of the computer readable map, and A and B are constant weights. Function N(FP) determines the number of non-free space pixels which lie within the footprint, I, boundary. Function d($p_{unknown}$, $p_{occupied}$, F) determines, for each pixel of the map with occupied or unknown states, how far into the footprint boundary the pixels penetrate, which takes a value of zero for all unknown or occupied pixels not within the boundary of the footprint. For consistency of explanation herein, a higher score will correspond to more errors, such as more occupied pixels penetrating a footprint, though one skilled in the art may appreciate the scoring may be inversed and/or normalized. It can be appreciated that the robot footprint 502 may intersect with segment 406 at positions between nodes. However, calculated the footprint score at nodes 216 can be sufficient to score a map without undue computations.

Next, a second scoring metric will be discussed in reference to FIG. 6A which depicts sensor 202 sensing a surface 402, wherein the sensor includes an unaccounted-for calibration error in its rotational axis, according to an exemplary embodiment. The same flat surface 402 is being sensed by the sensor 202 while the robot 102 travels in different directions along route 604. For example, the robot 102 may travel leftward initially, perform a U-turn, then navigate along the wall 402 in the opposite direction. Due to the angular positional error in the sensor 202, the portions of the surface 402 sensed at the two illustrated locations 202-1, 202-2 are mapped as shown by segments 602-1, 602-2 respectively. It is to be appreciated that this example is not limited to a single sensor on a robot, but could also be representative of two sensors on different robots, wherein at least one of the sensors is not accurately calibrated.

According to at least one non-limiting exemplary embodiment, the erroneous localization of the surface 402 shown by segments 602-1 and 602-2 may be caused by drift in odometry failing to accurately localize the robot 102, and thereby the sensor 202, at the proper physical location. In some instances, both odometry drift and miscalibrations may both cause errors to be present in a map.

As discussed above in reference to FIG. 3(*i-ii*), pixel states on a computer readable map may be changed under certain conditions. Namely, occupied pixels in portion 606 can be cleared since the perspective view of the sensor 202-2, without considering the calibration error in its pose, "sees beyond" the portion 606 of segment 602-1 onto segment 602-2, as shown by beams 208. Since, from the view of sensor 202-2, the portion 606 is no longer sensed, the controller 118 is safe to remove the segment from the map (e.g., object may have moved).

Once the robot 102 has completed the route 604, the controller 118 may analyze the produced map for divergences. As shown in FIG. 6A the sensor 202 takes discrete scans or measurements at known locations along the route 604. Often at least one scan is associated with a corresponding route node 216. To evaluate the map for divergences, a scan consistency score may be implemented. The scan consistency score involves, for each node 216 along the route where a scan was taken, placing the scan at the node 216 and determining disagreements between the scan and the map. As shown in FIG. 6B, the scan captured by the sensor at location 202-1 (FIG. 6A) is being simulated on top of the resulting computer readable map, according to an exemplary embodiment.

A plurality of beams 208, which may be illustrative of simulations of the beams emitted by a LiDAR sensor or depth camera, are illustrated. Many of the beams 208 pass through a perceived object 602-2 denoted by occupied pixels within portion 608 because while at the location 202-1 the sensor did not detect the portion 608. Additionally, portion 608 was not cleared via ray tracing upon the robot 102 navigating to the portion 608 at a later time. Accordingly, there is a large disagreement between the local scan acquired at location 202-1 and the resulting computer readable map.

Figure 6A:
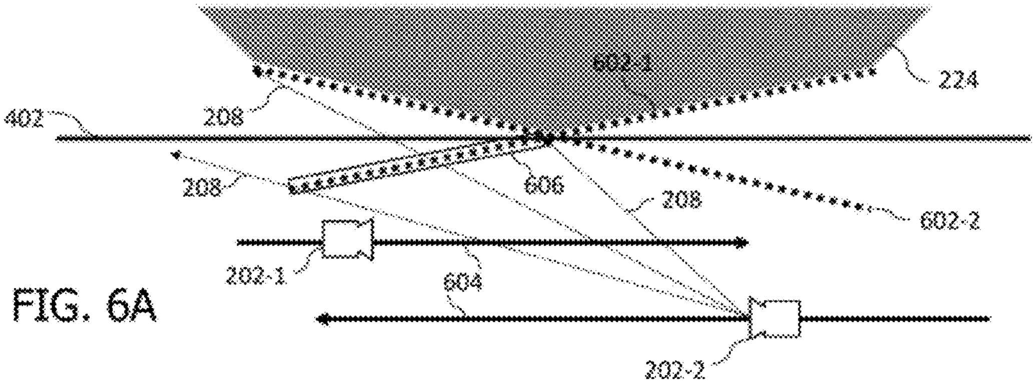
FIGS. 6A-B illustrate construction of a computer readable map used to calculate a scan consistency score, according to an exemplary embodiment.
Figure 6B:
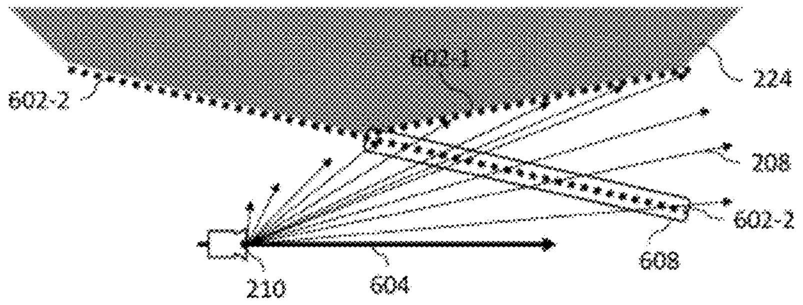

FIGS. 6A-B illustrates a clear example of a mapping error comprising a controller 118 adding occupied pixels which do not represent a true location of an object 402. The scan consistency score described herein can detect errors via increasing the score upon disagreements between a given scan and a map as illustrated. However, one skilled in the art would appreciate that computer readable maps are neither perfectly representative of the raw sensory inputs nor the physical environment. Often, errors in robotic localization accounted for when constructing a final representation of the environment on the map may cause small shifts in object locations and changes to features. For example, widths of hallways may be changed due to one or more optimization steps performed on the map, such as considering a plurality of localization constraints (and errors thereof due to imperfect localization). These small optimizations when performed over a large map may cause disagreements between any individual scan taken at a location and the completed, optimized map which, if the disagreements are large enough, may indicate a diverged or poor-quality map. Further, the locations or nodes 216 at which the scans substantially disagree with the final computer readable map may indicate areas where a map optimization or other error has occurred to cause divergence.

Figure 7A:
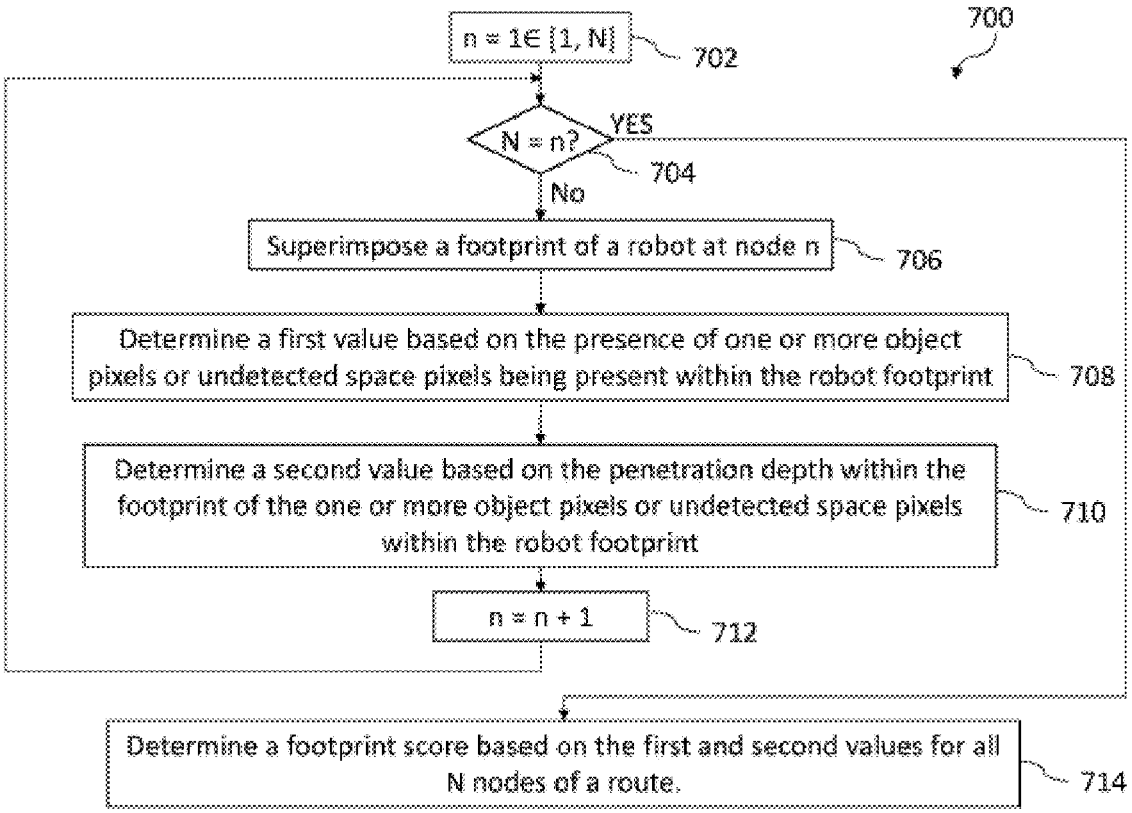
FIG. 7A is a process flow diagram illustrating a method for calculating a footprint score, according to an exemplary embodiment.
Figure 7B:
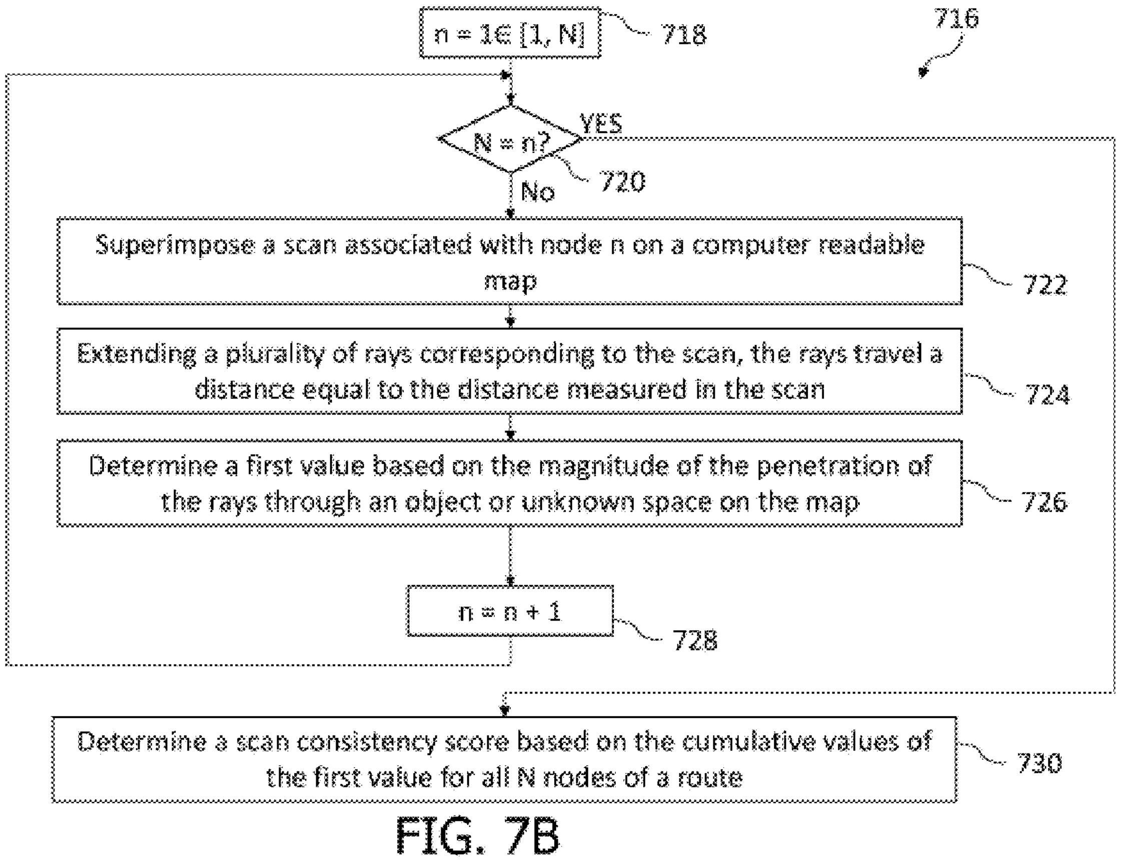
FIG. 7B is a process flow diagram illustrating a method for calculating a scan consistency score, according to an exemplary embodiment.
Figure 7C:
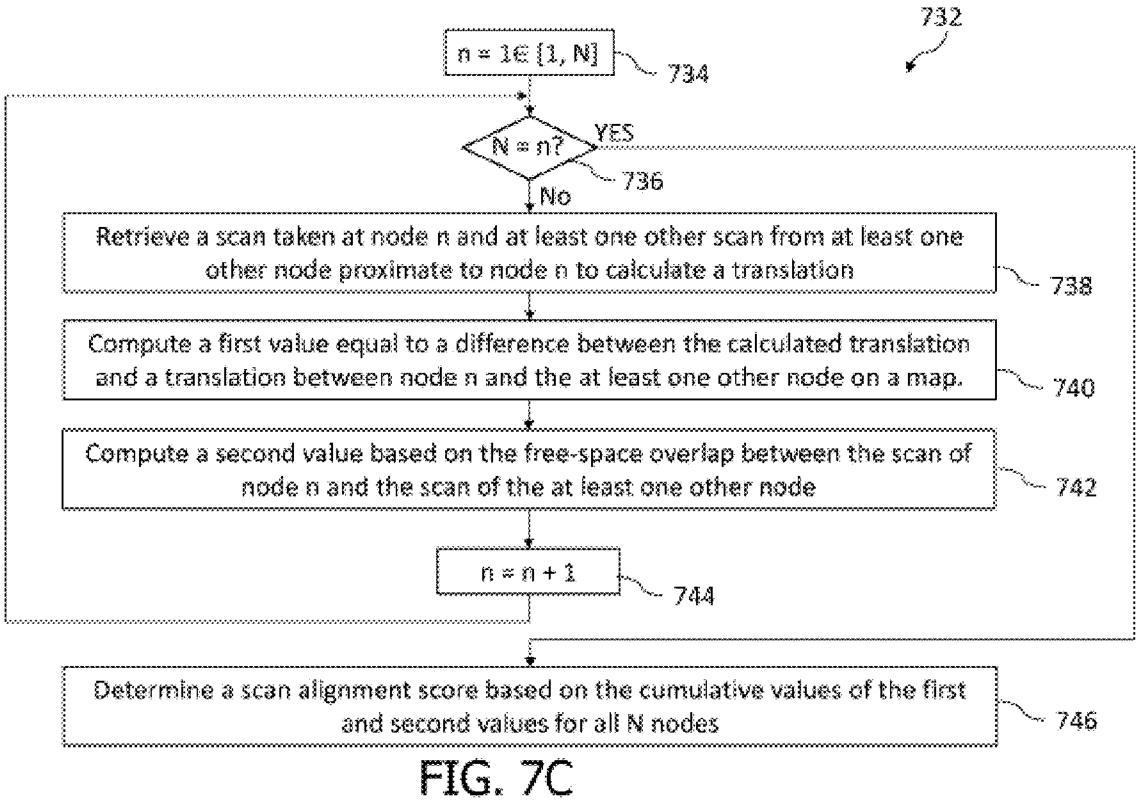
FIG. 7C is a process flow diagram illustrating a method for calculating a scan alignment score, according to an exemplary embodiment.

FIG. 7A-C are process flow diagrams illustrating three methods 700, 716 and 732 to determine three respective route scoring metrics, according to exemplary embodiments. Steps of methods 700, 716, 732 may be effectuated via the controller 118 executing computer readable instructions from a non-transitory storage device, such as memory 120, as appreciated by one skilled in the art. Methods 700, 716, 732 are executed after a robot 102 has completed one or more routes, aggregated sensor data into a computer readable map representing the environment and has optimized the computer readable map. The computer readable map is optimized, changed, or otherwise updated upon each execution of the route, wherein the map is then subsequently analyzed using methods 700, 716, 732 and others disclosed herein. It is assumed the maps discussed herein include collision-free paths which have been completed at least once autonomously, semi-autonomously, or under manual control.

First, in FIG. 7A, a method 700 for determining a footprint score is discussed. Method 700 begins in block 702 which includes setting a counter, n, equal to one. The counter n is a positive integer between 1 and N, with N being a real whole number equal to a number of route nodes 216 of a route. Method 700 may be considered as a for loop beginning at blocks 702-704 with setting n equal to one and performing steps of blocks 706-710 for all N nodes 216 of the route.

If the controller 118 determines all N nodes 216 of the route have been analyzed (i.e., n=N) at block 704, the controller 118 moves to block 714.

If at block 704 the controller 118 determines not all N nodes 216 of the route have been analyzed (i.e., n<N), the controller 118 moves to block 706.

Block 706 includes the controller 118 superimposing a digital representation of the robot, referred to as a footprint, onto the node n of the route. The footprint may estimate the size and shape of the robot 102 on the computer readable map and may comprise the same dimensions of the robot 102 in physical space scaled to the computer readable map.

Block 708 includes the controller 118 determining a first value based on the presence of one or more undetected space pixels 304 or object pixels 306 being present within the robot footprint boundaries. Assuming the robot 102 includes sensors capable of sensing the area along its direction of travel, it would not make physical sense for undetected space 304 to be present within the robot 102 body at a location where the robot 102 was traveling (i.e., the nth node 216), as this area should have been sensed prior to the robot 102 navigating there. Further, any object pixels 306 present within the boundary of the footprint (i.e., within an area occupied by the robot 102) does not make physical sense because a collision would have occurred if these pixels 306 represented true objects. Accordingly, it can be determined that these pixels 304, 306 that lie within the robot 102 footprint imposed at the node n are erroneous, and do not accurately represent the physical space. Given the physical limitations considered, i.e., that a robot 102 cannot have an object within itself without colliding with the object, these pixels 304, 306 will be scored against the quality of the map at the node n.

Block 710 includes the controller 118 determining a second value based on the penetration depth within the footprint of the one or more object pixels 306 or undetected space pixels 304 within the robot footprint. In one exemplary embodiment, for every undetected space or object pixel 304, 306 within the footprint, a distance to a nearest point along the boundary of the footprint is calculated. The aggregate of these distance measurements may form the second value. The second value should increase as the penetration depth of the pixels 304, 306 increases. Analogously, the second value calculates a penalty for unknown space 304 or objects 306 penetrating deep into the robot 102 footprint. As stated above, object pixels 306 penetrating deep into the footprint does not make physical sense as a collision would have occurred. Further, assuming the robot 102 does not have blind spots along its direction of travel, all regions where the robot 102 travels to and occupies should be sensed for objects, and therefore should include no unknown space 304. These pixels 304, 306 often penetrate the robot 102 footprint after map optimizations are performed or as a result of odometry drift and/or sensor calibration, wherein the second value increases to penalize the optimizations for causing the pixels 304, 306 to now intrude onto locations where the robot 102 needs to occupy in executing the route.

Block 712 includes the controller 118 incrementing n by one and returning to block 704 to repeat the footprint analysis for all N nodes of the route.

Block 714 includes the controller 118 determining a final footprint score of the route. In some embodiments, the final footprint score may be a single value based on the weighted summation of all the pixels 304, 306 which penetrate all N footprints for all N route nodes 216. In some embodiments, the footprint score may be a function of the route nodes 216 rather than a summation and may be stored as an array or matrix, wherein each element of the array/matrix corresponds to a footprint score for a corresponding node 216. While a single aggregate value for the footprint score may be used to determine if the map, as a whole, is diverged, denoting the footprint score per route node 216 may indicate locations where the map quality is poor. For example, by displaying the route nodes on the map and color coding the nodes based on their footprint score values, a heatmap of high and low scoring areas may be generated which may quickly communicate to a viewer where on the map footprint violations are occurring.

Next, in FIG. 7B, a method 716 for a controller 118 to calculate a scan alignment score is depicted via a process flow diagram, according to an exemplary embodiment. Like method 700 discussed previously, method 716 begins by setting a counter n equal to 1 in block 718, wherein n is a positive whole number between one and N. N being the total number of route nodes 216 of a route. The counter is then compared to N in block 720, creating a for loop comprising steps 722-728 for all N nodes 216 of the route.

Block 722 includes the controller 118 superimposing a scan taken by a sensor 202 and associated with the node n on a computer readable map. For each node 216 of the route, at least one associated scan by a LiDAR sensor 202 is measured. The scan includes a plurality of distances captured at different angles around an origin 210 of the sensor 202, the origin 210 being at a known location on the map. The measurement may be considered as a set of values comprising an x, y, and, if applicable, z location of the origin 210 as well as θ and distance values extending from the origin 210.

Block 724 includes the controller 118 extending a plurality of rays corresponding to the scan of block 722. The rays travel radially from the origin 210 of the sensor a distance equal to the distances measured in the scan. Each ray projected may correspond to a discrete angle along which a LiDAR sensor 202 emits a beam 208. The projected rays correspond to the distances measured while the robot 102 is at the node n and not distances that would be measured if the current map correctly reflects the environment, as shown in FIG. 6B for example. Rays which correspond to beams 208 that did not reflect back to the sensor 202, and thereby correspond to a "no measurement" reading, may be extended to the maximum range of the sensor 202 or ignored.

Block 726 includes the controller 118 determining a first value based on the magnitude the rays travel through unknown space 304 or travel through object pixels 306. Stated another way, the controller 118 performs a ray tracing procedure on the computer readable map for the scan taken at the node n. If a ray passes through a mapped object 306 pixel and extends substantially behind the object 306 pixel, it is likely that the object 306 pixel is erroneously localized or the sensor origin 210 is erroneously localized as it would be otherwise impossible for a light-based ToF LiDAR sensor to sense points behind (i.e., through) an object. Thus, the rays extending beyond an object behind what would be out of the line of sight of the sensor (if the map was an accurate reflection of the physical space) are used as a penalty for map quality. Similarly for the unknown space 304 pixels, the rays are simulated scans by the LiDAR sensor 202, wherein the path traveled by the beams 208 comprise measured/sensed space and therefore should not be marked as unknown 304 but may have been determined to be unknown 304 by the controller 118 performing optimizations to the map.

By way of an illustrative non-limiting example with reference to FIG. 6B, the plurality of rays 208 illustrated each do not align with the map and may each be counted as a penalty against the map quality at the illustrated location. Some of the rays 208 indicate an object is present based on the short distance measurement, however no object pixels 306 are mapped at the location or proximate thereto (i.e., within a radius of a few pixels). Some rays 208 extend beyond a portion 608 of occupied pixels 306, wherein the magnitude of the rays beyond the portion 608 may be counted towards the penalty. The remaining rays 208 not shown may correspond to "no measurement" readings indicating there is no object between the sensor 202 and the maximum range of the sensor 202 along the path of these rays. The map does not contain a disagreement with these rays 208 so these rays 208 are not counted towards the first value.

Block 728 includes the controller 118 incrementing n by one.

Block 730 includes the controller 118 determining a scan consistency score based on the first values for all N nodes 216. Like the footprint score discussed above, the scan consistency score may comprise a single numeric value as a summation of all scan consistency scores for all nodes, or as a function of the scan consistency score for each node 216. The scan consistency score provides analysis for localized disagreements between a measurement by a sensor of a physical space and the final, optimized map of the physical space.

FIG. 7C is a process flow diagram illustrating a method 732 for a controller 118 to calculate a local odometry score, according to an exemplary embodiment. The local odometry score compares the actual, measured translations/rotations of the robot 102 during movement to its path or route on a computer readable map. Failures in simultaneous localization and mapping ("SLAM") and/or biased instruments will not result in a substantial error when viewed in a local frame of, e.g., 5 or 10 route nodes 216. However, such biases may propagate errors through a larger pose graph and eventually compound to cause a map to diverge. Again, method 732 starts with setting a counter n equal to one in block 734 and performing a loop of blocks 738-744 for all N route nodes 216, as denoted by block 736 checking if the counter has reached N.

Block 738 includes the controller 118 retrieving a scan taken from node 216 n and one or more scans corresponding to one or more other nodes 216 proximate the node 216 n. The at least one other node 216 may be sequential nodes, e.g., n±5, or may be nodes 216 which are within a threshold distance from node 216 n (e.g., a switchback as shown in FIG. 6A).

Using the scans from these nodes 216, the controller 118 may align them to determine a transform which corresponds to the translations and rotations performed to move the robot 102 from one node to another. A more detailed explanation of how scan alignment yields translation information is provided below in FIGS. 10A-C but in short, the controller 118 aligns a feature of a given scan for a node 216 to the same feature in the scan of node 216 n, wherein the transform which causes alignment corresponds to the spatial transform needed to move from node 216 n to the given node 216. The controller 118 may calculate these translations between every one of the at least one other node 216 and the node 216 n.

According to at least one non-limiting exemplary embodiment, block 738 may calculate the translation instead using data from other localizing sensors such as, but not limited to, gyroscopes, encoders, motor feedback, and the like which measure the state of the robot 102 rather than external features (e.g., LiDAR sensors detecting ranges to objects). In some embodiments, both methods for determining actual translation by the robot 102 may be used to better measure the true displacement of the robot 102 between nodes. It is noted the "actual/true" displacement of the robot 102 may not correspond to the depicted displacement between nodes 216 on the map, rather corresponds to measurements collected by these sensors of physical space/states before, e.g., map optimizations. While using data from wheel encoders may be more reliable in determining displacement of the robot 102 in a local frame, it cannot be used for non-sequential route nodes 216 unlike scan matching because the non-sequential route nodes 216 may be separated by a sufficient length of route to allow drift in the odometry units to propagate meaningful errors.

Block 740 includes the controller 118 computing a first value equal to a difference between the (i) calculated translation between node n and the at least one other node selected, and (ii) a translation between node n and the at least one other node based on the map. If the map was an accurate reflection of the physical space and displacement of the robot 102, there should be no disagreement. However, map optimizations which attempt to align features may fail to represent the physical space if the optimizations align incorrect features, which may be common in feature-poor environments such as grocery stores with many identical (using LiDAR data) aisles. For instance, an optimizer may align the ends of one aisle with the ends of another aisle, causing the nodes 216 which pass through both aisles to be closer together than in the physical space (e.g., FIG. 8D). Such alignment would, however, not be seen in (i) LiDAR scan matching or (ii) encoder data as these data sources would also indicate translation using unoptimized measurements of the physical space which represent it more accurately. The distance between node n and the at least one other nodes may be measured by a number of pixels on the map, which can be translated into physical distances based on the resolution of the map. Disagreements between the map and the scan match transformation may indicate poor map quality, wherein the first value may increase if the disagreements are large or vice versa.

In addition to calculating disagreements between the measured translation and the mapped translation of the robot 102, the controller 118 may further calculate the alignment of free space 304 detected at node n with the free space detected at the at least one other node. As discussed above in FIG. 3(*i-ii*), free space must be directly measured by detecting a lack of an object being present therein. Accordingly, if the robot 102 detects free space at node n for a given group of pixels, those same pixels should also be marked as free space at the at least one other nodes which include sensor data for that group of pixels, at least in part. More importantly, both scans should not disagree about the presence of an object. However, they can disagree between free space 308 and unknown 304 without counting towards a map quality penalty since unknown 304 space is not directly measured. That is, unknown space can be either free space or occupied space, so measured free space may be mapped onto unknown space.

To state it another way, at node n controller 118 may calculate a plurality of free space pixels 308, denoted as $M_n$ comprising a tensor of pixels and their corresponding state (i.e., unknown, occupied, free space). The controller 118 may also calculate $M_m$ for nodes 216*m*, wherein nodes 216*m* correspond to the selected at least one other node in block 738. The controller 118 may perform a pairwise comparison of these matrices. $M_n$ and $M_m$, for pixels at the same physical location on the map. For instance, if pixel (x1, y1) of $M_n$ is a free space pixel but a pixel (x2, y2) of $M_m$ corresponding to the same physical space/location includes an occupied pixel 306, the second value may increase as a means to penalize the map quality. If (x1, y1) of $M_n$ is occupied but the same location is free space in $M_m$, no penalty is added as the penalty indicating the disagreement will be added when node m becomes the base node for comparison (i.e., to avoid double counting penalties). If both are free space pixels, no penalty is added. If pixel (x1, y1) of $M_n$ is a free space pixel but a pixel (x2, y2) of $M_m$ corresponding to the same physical space/location includes an unknown pixel 304, no penalty is added. If pixel (x3, y3) of a third $M_n'$ corresponding to the same physical space/location as free space pixel (x1, y1) and unknown pixel (x2, y1) is an occupied pixel, a penalty would be assigned when n' is the base node for comparison because the same space/location cannot be free space and occupied. The controller 118 may continue to perform this comparison for every element of the matrices, then repeat for every pair of nodes.

Block 744 includes the controller 118 incrementing n by one.

Block 746 includes the controller determining a scan alignment score based on the cumulative values of the first and second values for all N nodes 216 of the route. That is, based on the first value for node n (block 740) and the second value for the node n (block 742), a scan alignment score may be determined for the single node n. The same score may then be calculated for all N nodes 216 and be represented as a single value or as a score per node function, similar to the footprint and scan consistency scores discussed above. The scan alignment score provides two constraints: (i) ensures physical translation of the robot 102 on the map is accurate to its true translation in physical space, and (ii) ensures physical objects are not substantially moved, as will be illustrated below in FIG. 8A-B.

Figure 8A:
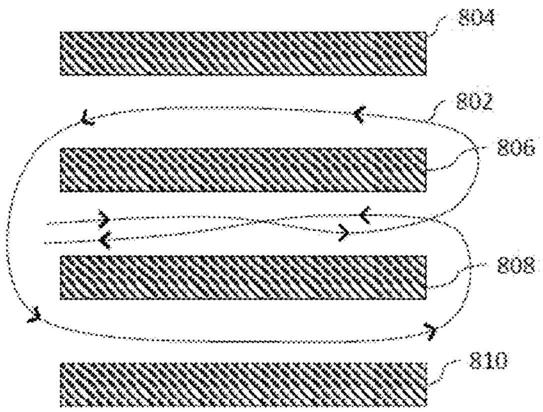
FIG. 8A-B illustrate an idealized construction of a computer readable map with errors caused by odometry drift, according to an exemplary embodiment.
Figure 8B:
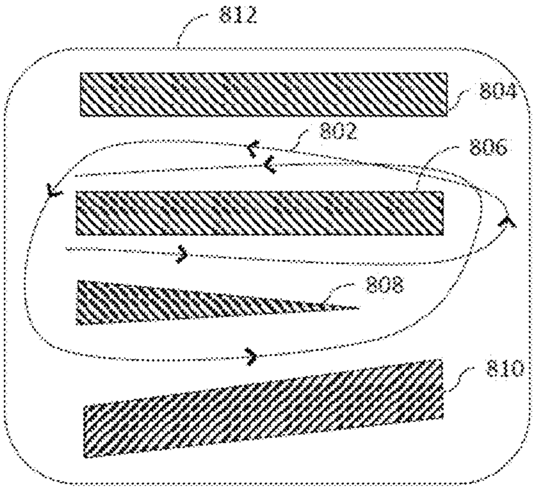

FIG. 8A-B illustrate a route 802 navigated by a robot 102 through a plurality of objects 804, 806, 808, 810 and a resulting computer readable map 812, according to an exemplary embodiment. The objects 804, 806, 808, 810 comprise identical, feature-poor rectangles (i.e., they comprise very few identifying characteristics such as shape). The robot 102 may include a biased odometry unit which, in the illustrated example, is under-biased when performing left hand turns, thereby causing the robot 102 to potentially over-estimate the distance traveled in executing a, e.g., 90° turn.

The route 802 includes two loops between aisles formed by the objects 804, 806, 808, and 810. Since the aisles appear identical, and there are no other features nearby to identify which aisle is which, the controller 118 in performing map optimizations may erroneously align the end of the middle aisle between objects 806 and 808 with the end of the lower aisle between objects 808 and 810. Since the encoder is under-biased for left hand turns, the final left hand turns when exiting objects 808, 810 and entering objects 806, 808 in FIG. 8A may be overestimated, wherein the controller 118 erroneously determines the robot 102 went in between objects 804, 806.

Further, since the environment is feature-poor, when exiting the aisle between objects 808, 810 the controller 118 may not be able to determine if it is exiting from between objects 808, 810 or objects 806, 808 (further made difficult by the biased odometry) and may combine the two exits, as shown by the objects 808 and 810 on the map 812 in FIG. 8B comprising different shapes. It is appreciated by one skilled in the art that the morphing of the object 808 shape may be the result of the controller 118 considering a plurality of constraints in optimization, no single of which is often readily recognizable as the cause of a particular final shape for an object. Regardless of the cause of the error, however, the three scoring metrics described in FIG. 7A-C above may indicate (i) the map 812 contains a substantial error, and (ii) locations where the error is present.

For instance, the footprint score (FIG. 7A) in this embodiment may not indicate any errors since the surfaces of the objects 804, 806, 808, 810 are flat and contain few protrusions. The scan consistency score (FIG. 7B) may indicate some errors when analyzing nodes between objects 808, 810, Also, the scan alignment score (FIG. 7C) may indicate the leftmost portions of the route 802 on the map 812 disagree with the physical translations of the robot 102. Additionally, the scan alignment score would indicate disagreement in the measurement of free-space pixels 304 around route nodes 216 between objects 806, 808 and objects 808, 810. Accordingly, it may be determined that the nodes 216 between objects 808, 810 should be re-evaluated as the turn into this aisle may have propagated an underestimated left-hand turn (as shown by the slight slant of object 810). Upon reevaluating this segment, and accounting for what the robot 102 thought was upward/right diagonal movement in map optimization but is measured to be straight (i.e., parallel to object 804, 806 surface), the remaining route solution may be adjusted to enter the aisle between objects 806, 808 instead of the erroneous entry between objects 804 and 806 as shown in map 812. Alternatively, if the map is too diverged for automatic corrections (i.e., the sum of the three map quality scores exceeds a threshold), the controller 118 may request redemonstration of the route or may explore the environment around objects 806, 808, 810 to collect more data from which to constrain the optimization of the computer readable map 810.

Figure 8C:
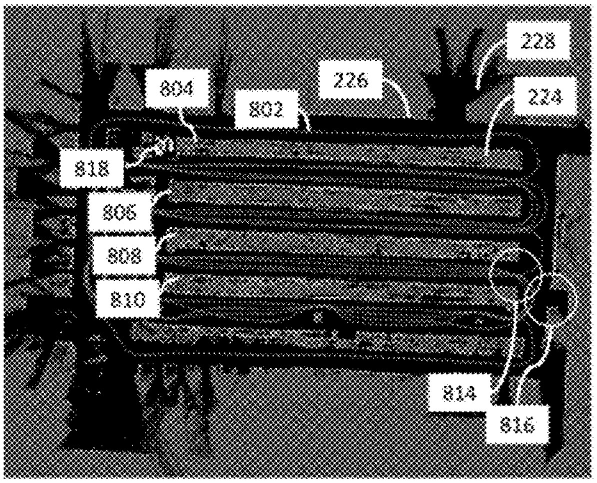
FIG. 8C-D illustrate a proper and diverged computer readable map of an environment produced by a robot, according to an exemplary embodiment.
Figure 8D:
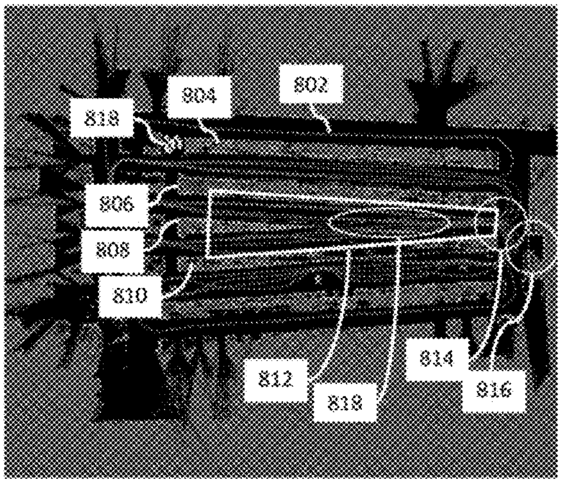

FIGS. 8C-D are renderings of a computer readable map collected by a robot 102 in an environment similar to the idealized scenario depicted in FIG. 8A-B above, according to an exemplary embodiment. For reference, unknown space 304 is shown as grey, occupied space 306 is shown as light grey, and free space 308 is black. First, FIG. 8C depicts a map of the environment which has been corrected automatically and/or by manual editing to accurately reflect the environment. The environment comprises four or more objects 804, 806, 808, and 810 that form parallel aisles. For clarity and case of explanation, the robot 102 makes only counterclockwise loops around the objects 804, 806, 808, 810, and thereby enters the aisles between the objects 804, 806, 808, 810 from the left-hand side using a left turn and exits from the right-hand side using left turns as well. The route 802 begins proximate to a landmark 818 which is at a known, fixed location in the environment.

If odometry drift and sensor calibration can be controlled and accounted for, the robot 102 should produce a map of the environment shown in FIG. 8C. The route 802 depicted includes a plurality of loops around the objects 804, 806, 808, 810 wherein odometry drift may, over long distances, introduce error substantial enough to cause the map produced to be diverged as shown next in FIG. 8D.

In FIG. 8D, the robot 102 has executed the route 802 and aggregated its sensor data to produce a computer readable map of the environment. The map includes the object 808 being collapsed and object 810 and other walls/surfaces having a tilted angle such that they are no longer parallel to the other objects 804, 806. An object is considered collapsed if its outer boundaries are shown on the map to be smaller than they are in the physical world. Often this includes removing a substantial amount of space occupied by these collapsed objects such as object 808 being reduced to a small triangle about half the length of its true size shown in FIG. 8C. Drift in odometry units over time may cause the robot 102 to, for instance, over-estimate a left hand turn into an aisle formed by objects 808, 810, thereby causing the controller 118 to map the surfaces of objects 808, 810 at a skewed angle as shown. While constructing the map using this biased data, the controller 118 may consider a plurality of constraints. These constraints include but are not limited to: (i) odometry data, which is susceptible to drift; (ii) sensor data, which is susceptible to miscalibration; and (iii) feature matching (e.g., aligning a static object between scans to determine position relative to the object/positions), which is prone to improper alignment or aligning different objects (e.g., two substantially rectangular objects 806, 808, 810). Since all of the data sources collected by the robot 102 are subject to at least some error, the controller 118 cannot rely on any one as ground truth and must therefore make reasonable inferences when aggregating the data to form a map to represent the environment. If the number and/or magnitude of errors are substantial, a map may be diverged as shown in FIG. 8D.

To illustrate further, with reference to FIG. 8C, the controller 118 may utilize its odometry units to determine when it is at a location 814 (encircled) corresponding to the rightmost edge of an aisle formed by objects 808, 810. The end of the aisle is proximate to a feature 816 (encircled) comprising an indent in an otherwise flat wall. This indent would appear in scans taken proximate to the feature 816, namely at location 814 but other locations also may sense the feature 816. When executing the route 802, odometry drift may cause the robot 102 to, e.g., overestimate how far it has turned when making left hand turns. The drift causes overestimation to grow over time, wherein the bias at the beginning of the route 802 may be smaller than the bias towards the end of the route 802. As the robot 102 performs loops around objects 804, 806, the odometry drift may be minimal and therefore enable the controller 118 to accurately map these two objects in FIG. 8D as parallel rectangles. Over time, however, as the robot 102 continues to perform loops and eventually loop in between objects 808, 810, the odometry drift may cause the robot 102 to perceive it has turned more than 90° while seeing two parallel surfaces of objects 808, 810. Accordingly, the controller 118 will map the two parallel surfaces at a skewed angle which, eventually, intersects with the aisle formed by objects 806, 808. The intersection is shown via object 808 being collapsed into an aisleway. Due to the feature 816 being present near the exits of the two aisles formed by objects 806, 808, 810, and the poor localization due to odometry drift, the controller 118 may localize the feature 816 being proximate to a single aisleway between objects 806, 810 during map optimization resulting in the diverged map 8D as shown.

To detect if the map in FIG. 8D is diverged, the three scores discussed in FIGS. 7A-C above may be implemented. First, and most obvious, the footprint score is very high in region 812 due to a plurality of route 802 points overlapping with object points in the region 812. More specifically, at encircled portion 818 there are a plurality of object points and route trajectories which coincide with each other, wherein one may envision a robot 102 footprint placed in the region 812 would also coincide with object points. The remaining object points within region 818 may be due to the optimization which caused the aisle to collapse. Due to the collapsing of object 808, a plurality of occupied pixels may be placed within the newly formed aisle between objects 806, 810. Additionally, the scan scores will increase moving from left to right within region 812 as the added width of the aisle, in addition to the plurality of occupied pixels therein, will cause substantial disagreement between the measurements taken and the resulting map. The scan consistency score may also be high for route nodes 216 located near the end of the aisle below object 810 using the feature 816. A method for aligning a feature seen in two scans to determine a relative position to the object is discussed in FIG. 10A-C below. Scan scores for route nodes 216 near the end of the aisle between objects 808, 810 will be small as the feature 816 is still below (on the page) the exit of this aisle at approximately the correct distance. Lastly the scan alignment score would be high near the left-side entrance of the aisle between objects 806, 808 as well as below object 810, low within the aisle, and high again near the right-side exit. Since the scan alignment score is measured using local reference frames, odometry drift is negligible, and the disagreements between the computer readable map of FIG. 8D and the unbiased odometry measurements yield a high score.

FIGS. 8C-D illustrate a real-world example of a diverged map to illustrate the causes of divergence as well as how the various map quality metrics can be used to detect the divergence of the map in FIG. 8D. The map shown in FIG. 8D is a map produced by sensor data collected during or after demonstration of a route 802 to a robot 102, e.g., its first execution of the route 802. The robot 102 may attempt to utilize the map, however it may become delocalized upon entering between objects 806, 808, 810 since the map does not accurately reflect the physical space (e.g., represented by sensor unit 114 data collected). The map shown in FIG. 8C is a corrected version of the map produced in FIG. 8D via minimizing the divergence scoring metrics described in methods 700, 716, and 732 above. As discussed above, the scoring metrics disclosed herein not only enable a controller 118 or processor to determine if a map is diverged but may also indicate where the map began to diverge/include errors via modifying methods 700, 716, and 732 by performing the scores on a per-node n basis rather than a cumulative summation of all N nodes. The scores may be substantially high proximate the collapsed aisle formed by objects 806, 808, and 810, namely footprint scores. Accordingly, the controller 118 or other processor may locally correct the map at these locations to consider new constraints when constructing a final, optimized map. For instance, in some non-limiting exemplary embodiments, the controller 118 may be configured to minimize one or more of the scoring metrics, such as the scan consistency score (FIG. 7B), disclosed herein while performing iterative corrections to nodes 216 of the route 802. Correcting the node locations would thereby correct the locations of the objects with respect to the route 802. As another example, a human reviewer may edit the route 802 based on the controller identifying high-scoring areas, wherein the human edits to the route 802 may be further utilized to constrain the locations of the objects 804, 806, 808, 810 on the map.

In addition to feature matching, another primary constraint used in map construction is loop closures, or points along the route 802 where the robot 102 visits more than once. These points are not only constrained to be at the same physical space (i.e., should be at the same pixel on the map) but also constrain the segment of route beginning and ending at the point (i.e., the "loop"). For instance, consider a perfect circle route which begins and ends at the same location. The route is constrained in that (i) it must include two points at the same location, and (ii) includes a loop with a length measured by sensor units 114. If the optimized computer readable map does not include the same length of loop as measured via sensor units 114, the scan alignment score will increase.

Given enough maps, the three scoring functions denoted herein: $f_{fp}(n)$, $f_s(n)$, and $f_{sa}(n)$ for nodes $n \in [1, N]$ corresponding to the footprint score, scan score, and scan alignment score respectively may provide sufficient data to form patterns used to identify diverged maps, and where the maps diverge. More specifically, the scores as a function of location along the route, n, in addition to the map data itself (i.e., the matrix of pixels and their corresponding states) may be provided as training data to a model to configure the model to predict if a given map is diverged using the three scores. Preferably the computation of the scores and execution of the model to determine diverged maps may be executed via a processor separate from the robot 102 to not overburden the controller 118 with tasks separate from its normal task of operating the robot 102. However, the controller 118 may perform the inference provided (i) the robot 102 is idle, or (ii) the controller 118 comprises sufficient computing bandwidth.

Figure 9:
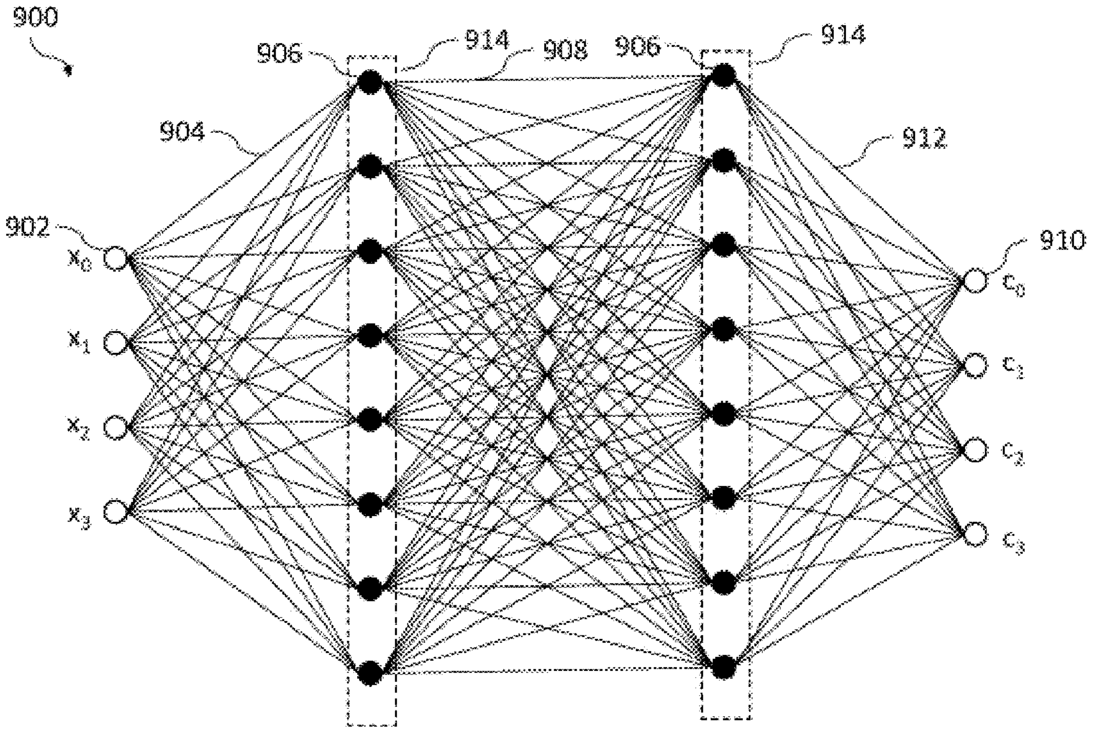
FIG. 9 is a trainable neural network in accordance with some embodiments of this disclosure.

FIG. 9 illustrates a neural network 900, according to an exemplary embodiment. The neural network 900 may comprise a plurality of input nodes 902, intermediate nodes 906, and output nodes 910. The input nodes 902 are connected via links 904 to one or more intermediate nodes 906. Some intermediate nodes 906 may be respectively connected via links 908 to one or more adjacent intermediate nodes 906. Some intermediate nodes 906 may be connected via links 912 to output nodes 910. Links 904, 908, 912 illustrate inputs/outputs to/from the nodes 902, 906, and 910 in accordance with equation 2 below. The intermediate nodes 906 may form an intermediate layer 914 of the neural network 900. In some embodiments, a neural network 900 may comprise a plurality of intermediate layers 914, intermediate nodes 906 of each intermediate layer 914 being linked to one or more intermediate nodes 906 of adjacent layers, unless an adjacent layer is an input layer (i.e., input nodes 902) or an output layer (i.e., output nodes 910). The two intermediate layers 914 illustrated may correspond to a hidden layer of neural network 900; however a hidden layer may comprise more or fewer intermediate layers 914 or intermediate nodes 906. Each node 902, 906, and 910 may be linked to any number of nodes, wherein linking all nodes together as illustrated is not intended to be limiting. For example, the input nodes 902 may be directly linked to one or more output nodes 910.

The input nodes 906 may receive a numeric value $x_i$ of a sensory input of a feature, i being an integer index. For example, $x_i$ may represent color values of an $i^{th}$ pixel of a color image. The input nodes 906 may output the numeric value $x_i$ to one or more intermediate nodes 906 via links 904. Each intermediate node 906 may be configured to receive a numeric value on its respective input link 904 and output another numeric value $k_{i,j}$ to links 908 following the equation 2 below:

$$k_{i,j}=a_{i,j}x_0+b_{i,j}x_i+c_{i,j}x_2+d_{i,j}x_3 \quad \text{(Eqn. 2)}$$

Index i corresponds to a node number within a layer (e.g., $x_1$ denotes the first input node 902 of the input layer, indexing from zero). Index j corresponds to a layer, wherein j would be equal to one for the one intermediate layer 914-1 of the neural network 900 illustrated, however, j may be any number corresponding to a neural network 900 comprising any number of intermediate layers 914. Constants a, b, c, and d represent weights to be learned in accordance with a training process. The number of constants of equation 2 may depend on the number of input links 904 to a respective intermediate node 906. In this embodiment, all intermediate nodes 906 are linked to all input nodes 902, but this is not intended to be limiting. Intermediate nodes 906 of the second (rightmost) intermediate layer 914-2 may output values $k_{i,2}$ to respective links 912 following equation 2 above. It is appreciated that constants a, b, c, d may be of different values for each intermediate node 906. Further, although the above equation 2 utilizes addition of inputs multiplied by respective learned coefficients, other operations are applicable, such as convolution operations, thresholds for input values for producing an output, and/or biases, wherein the above equation is intended to be illustrative and non-limiting.

Output nodes 910 may be configured to receive at least one numeric value $k_{i,j}$ from at least an $i^{th}$ intermediate node 906 of a final (i.e., rightmost) intermediate layer 914. As illustrated, for example, each output node 910 receives numeric values $k_{0-7,2}$ from the eight intermediate nodes 906 of the second intermediate layer 914-2. The output of the output nodes 910 may comprise a classification of a feature of the input nodes 902. The output $e_i$ of the output nodes 910 may be calculated following a substantially similar equation as equation 2 above (i.e., based on learned weights and inputs from connections 912). Following the above example where inputs $x_i$ comprise pixel color values of an RGB image, the output nodes 910 may output a classification $e_i$ of each input pixel (e.g., pixel i is a car, train, dog, person, background, soap, or any other classification). Other outputs of the output nodes 910 are considered, such as, for example, output nodes 910 predicting a temperature within an environment at a future time based on temperature measurements provided to input nodes 902 at prior times and/or at different locations.

The training process comprises providing the neural network 900 with both input and output pairs of values to the input nodes 902 and output nodes 910, respectively, such that weights of the intermediate nodes 906 may be determined. An input and output pair comprise a ground truth data input comprising values for the input nodes 902 and corresponding correct values for the output nodes 910 (e.g., an image and corresponding annotations or labels). The determined weights configure the neural network 900 to receive input to input nodes 902 and determine a correct output at the output nodes 910. By way of illustrative example, annotated (i.e., labeled) images may be utilized to train a neural network 900 to identify objects or features within the image based on the annotations and the image itself, the annotations may comprise, e.g., pixels encoded with “cat” or “not cat” information if the training is intended to configure the neural network 900 to identify cats within an image. The unannotated images of the training pairs (i.e., pixel RGB color values) may be provided to input nodes 902 and the annotations of the image (i.e., classifications for each pixel) may be provided to the output nodes 910, wherein weights of the intermediate nodes 906 may be adjusted such that the neural network 900 generates the annotations of the image based on the provided pixel color values to the input nodes 902. This process may be repeated using a substantial number of labeled images (e.g., hundreds or more) such that ideal weights of each intermediate node 906 may be determined. The training process is complete when predictions made by the neural network 900 fall below a threshold error rate which may be defined using a cost function.

As used herein, a training pair may comprise any set of information provided to input and output of the neural network 900 for use in training the neural network 900. For example, a training pair may comprise an image and one or more labels of the image (e.g., an image depicting a cat and a bounding box associated with a region occupied by the cat within the image).

Neural network 900 may be configured to receive any set of numeric values representative of any feature and provide an output set of numeric values representative of the feature. For example, the inputs may comprise color values of a color image and outputs may comprise classifications for each pixel of the image. As another example, inputs may comprise numeric values for a time dependent trend of a parameter (e.g., temperature fluctuations within a building measured by a sensor) and output nodes 910 may provide a predicted value for the parameter at a future time based on the observed trends, wherein the trends may be utilized to train the neural network 900. Training of the neural network 900 may comprise providing the neural network 900 with a sufficiently large number of training input/output pairs comprising ground truth (i.e., highly accurate) training data. As a third example, audio information may be provided to input nodes 902 and a meaning of the audio information may be provided to output nodes 910 to train the neural network 900 to identify words and speech patterns.

Generation of the sufficiently large number of input/output training pairs may be difficult and/or costly to produce. Accordingly, most contemporary neural networks 900 are configured to perform a certain task (e.g., classify a certain type of object within an image) based on training pairs provided, wherein the neural networks 900 may fail at other tasks due to a lack of sufficient training data and other computational factors (e.g., processing power). For example, a neural network 900 may be trained to identify cereal boxes within images, but the same neural network 900 may fail to identify soap bars within the images.

As used herein, a model may comprise the weights of intermediate nodes 906 and output nodes 910 learned during a training process. The model may be analogous to a neural network 900 with fixed weights (e.g., constants a, b, c, d of equation 2), wherein the values of the fixed weights are learned during the training process. A trained model, as used herein, may include any mathematical model derived based on a training of a neural network 900. One skilled in the art may appreciate that utilizing a model from a trained neural network 900 to perform a function (e.g., identify a feature within sensor data from a robot 102) utilizes significantly less computational recourses than training of the neural network 900 as the values of the weights are fixed. This is analogous to using a predetermined equation to solve a problem as compared to determining the equation itself based on a set of inputs and results.

According to at least one non-limiting exemplary embodiment, one or more outputs $k_{i,j}$ from intermediate nodes 906 of a $j^{th}$ intermediate layer 912 may be utilized as inputs to one or more intermediate nodes 906 an $m^{th}$ intermediate layer 912, wherein index m may be greater than or less than j (e.g., a recurrent or feed forward neural network). According to at least one non-limiting exemplary embodiment, a neural network 900 may comprise N dimensions for an N dimensional feature (e.g., a 9-dimensional input image or point cloud), wherein only one dimension has been illustrated for clarity. One skilled in the art may appreciate a plurality of other embodiments of a neural network 900, wherein the neural network 900 illustrated represents a simplified embodiment of a neural network to illustrate the structure, utility, and training of neural networks and is not intended to be limiting. The exact configuration of the neural network used may depend on (i) processing resources available, (ii) training data available, (iii) quality of the training data, and/or (iv) difficulty or complexity of the classification/problem. Further, programs such as AutoKeras, utilize automatic machine learning ("AutoML") to enable one of ordinary skill in the art to optimize a neural network 900 design to a specified task or data set.

Figure 10A:
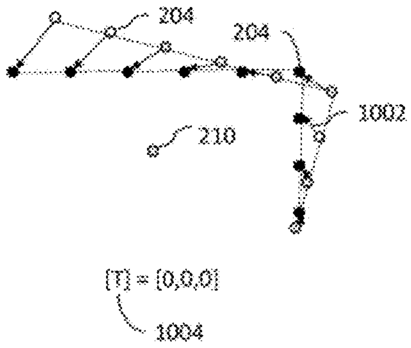
FIGS. 10A-C illustrate a process of scan matching in accordance with some embodiments of this disclosure.
Figure 10B:
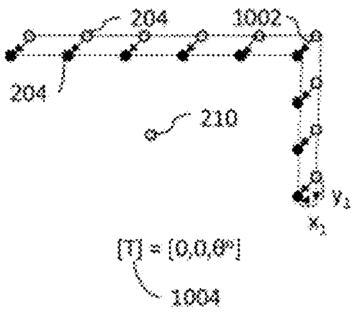
Figure 10C:
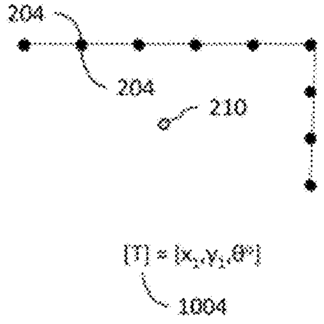

FIGS. 10A-C illustrate a process of scan matching, in accordance with some embodiments of this disclosure (e.g., block 738 of FIG. 7C). Scan matching comprises a processor of controller 118 of a robot 102 determining a mathematical transformation, which aligns points 204 of a first scan to points 204 of a second scan. This transformation may denote the change of position of the robot 102 between the first and second scans, provided the object the points 204 represent is stationary. First, in FIG. 10A, two sets of scans from a LiDAR sensor 202 are illustrated. A first scan may generate a plurality of points 204 shown in black and a second scan may generate a plurality of points 204 shown in white. The spatial difference between the two sets of points 204 may be a result of a robot 102 comprising the sensor 202 moving. More specifically, during the period between the first and second scans, the robot 102 rotates by θ° and translates a distance $x_1$, $y_1$. The two sets of points 204 may localize the same object(s), such as a corner of a room for example. The two sets of points 204 are defined in a local reference frame centered about a sensor origin 210 of the sensor 202 that collected the two scans.

Scan matching comprises a controller 118 of the robot 102 determining a transformation 1004 along x, y, and θ which aligns the two sets of points 204. That is, the transformation 1004 minimizes the spatial discrepancies 1002 between nearest neighboring points of the two successive scans. Starting in FIG. 10A, controller 118 receives the two sets of points 204 (white and black) and first determines that a rotation of θ° may reduce the magnitude of discrepancies 1002. As shown in FIG. 10B, the controller 118 has applied the rotation of θ° to the second set of points 204. Accordingly, transformation 1004 is updated to include the rotation of θ°. Next, controller 118 may calculate a spatial translation of the second set of points 204 which minimizes discrepancies 1002. In this embodiment, the translation includes a translation of $y_1$ and $x_1$ as shown, wherein $y_1$ and $x_1$ may be positive or negative values. FIG. 10C illustrates the two sets of points after the controller 118 applies the translation of $x_1$ and $y_1$ to the second set of points 204. As shown, discrepancies 1004 vanish and the two sets of points 204 align. Accordingly, controller 118 updates transform 1004 to include the translation of $[x_1, y_1]$. In some instances, perfect alignment may not occur between the two sets of points 204 but transform 1004 is configured to minimize discrepancies 1002.

It is appreciated that scan matching may include the controller 118 iteratively applying rotations, translations, rotations, translations, etc. until discrepancies 1002 are minimized. That is, controller 118 may apply small rotations which reduce discrepancies 1002, followed by small translations further reducing discrepancies 1002, and interactively repeat until the discrepancies 1002 no longer decrease under any rotation or translation. Controller 118 immediately applying the correct rotation of θ° followed by the correct translation of $[x_1, y_1]$ is for illustrative purposes only and is not intended to be limiting. Such iterative algorithms may include, without limitation, iterative closest point ("ICP") and/or pyramid scan matching algorithms commonly used within the art.

Transform 1004 may denote the transformation or change in position of the object of which points 204 localize as perceived from the reference frame of the robot 102. When viewed from an external reference frame, such as one defined about a static origin point in the environment (e.g., a point on a floor), the transform 1004 may instead denote the change in position of the robot 102 between the first and second scans, assuming the object is stationary. Accordingly, scan matching may be utilized to determine motions of the robot 102 between two scans. That is, the robot 102 may translate and rotate by an amount denoted by transform 1004 during the time between acquisition of the first set of points 204 and the second set of points 204 from the same sensor 202.

Although illustrated in two dimensions, scan matching between two sets of points 204 may occur in three dimensions. That is, transform 1004 may further include [z, pitch, roll] transformations which cause the two sets of points 204 to align in some non-limiting exemplary embodiments.

In addition to determining a displacement, the scan matching may also be utilized to correlate two features of two scans as the same feature. A first scan of an object would indicate its shape, wherein the object could be found in a second scan by aligning points of the second scan to points in the first scan representing the object, provided both scans sense at least in part the same surface of the object. Identifying common features within scans is often used as an additional constraint in localization and map construction because identifying common features may indicate the position of the robot 102 relative to environment objects seen at other locations along a route. The transform 1004 may indicate the displacement between the first scan of the object and the second scan of the object. Scan matching for identifying common features between multiple scans may not always yield a perfect solution such as the one illustrated in FIG. 10A-C and often is based on minimizing discrepancies 1002 (not to zero). Such minimization process may, as one skilled in the art would appreciate, correlate two different objects as the same feature if the two different objects are substantially similar (e.g., objects 804, 806, 808, 810 of FIG. 8A or 8C).

Figure 11:
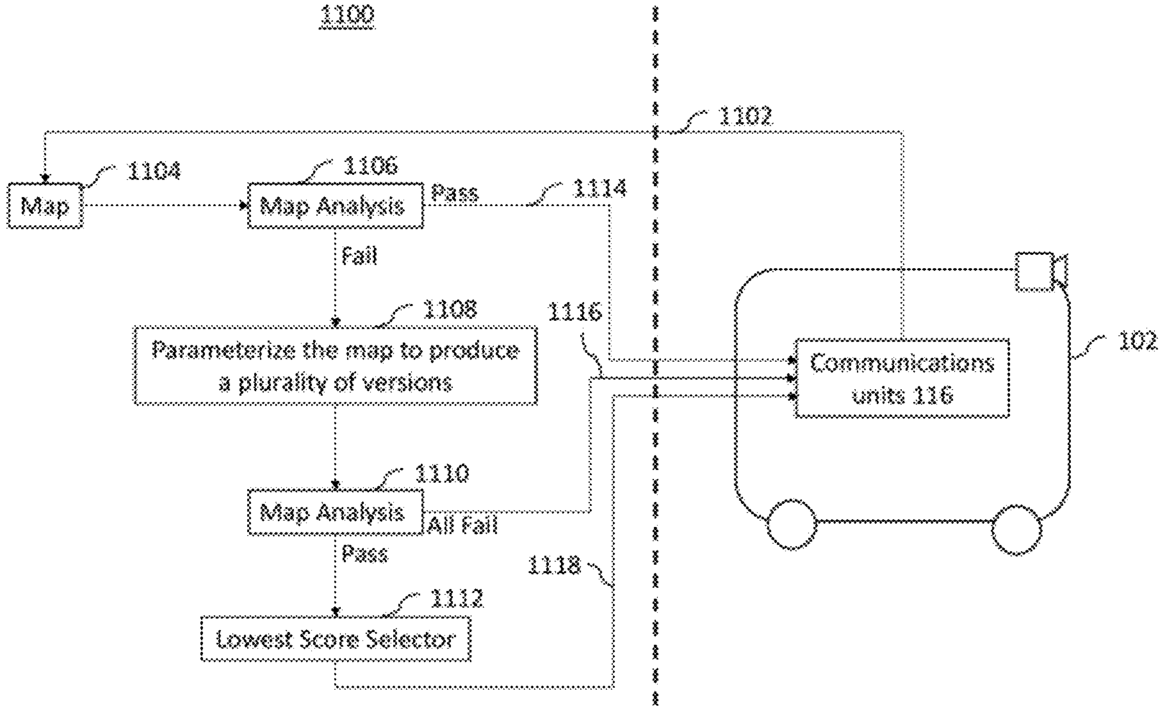
FIG. 11 is a system block diagram configured to correct and/or improve a computer readable map from a robot, according to an exemplary embodiment.

FIG. 11 is a functional block diagram of a remote system configured to determine a useable computer readable map for a robot 102, according to an exemplary embodiment. The remote system 1100, shown separate from the robot 102, may represent another robot 102 (e.g., one which is idle or otherwise available for additional processing of map data), a remote server (e.g., a cloud server), and/or a personal computing device (e.g., a smartphone, a personal computer, etc. coupled to the robot 102 over Wi-Fi, Bluetooth®, or other network). It is further appreciated that the robot 102 could perform the same functions as the remote system 1100 provided the robot 102 comprises sufficient computation resources.

As the robot 102 moves around its environment and executes various routes and/or tasks, a computer readable map 1104 is produced by the controller 118 of robot 102. Every subsequent iteration or execution of tasks/routes may generate a new version of the computer readable map. The new version may be based, at least in part, on prior iterations of the map in conjunction with new sensory data collected during the present task/route execution. Small changes in the environment, noise and imperfections in sensory instruments, calibration drift, and various map optimizations may cause the maps to differ slightly from each other, even for robots 102 navigating the same static environment.

If mapping is successful with minimal noise, calibration errors, or other discrepancies, the map 1104 produced by the robot 102 during the most recent task or route execution may be communicated to the remote system 1100 via communications units 116 (step 1102). The map 1104 is provided to a map analysis 1106 block which executes at least one of methods 700, 716, and 732 to provide various scoring metrics to the map 1104. If the map 1104 scores below a threshold, the map 1104 is considered accurate enough to utilize during subsequent navigations. Tighter thresholds may be employed if the map 1104 is used for additional purposes beyond the robot 102 merely navigating, such as accurately representing the environment to report performance metrics or interacting with small objects on the map. If the map 1104 passes the threshold, the remote system 1100 may provide communications 1114 to the robot 102 indicating the map 1104 is validated with sufficient quality for navigation.

In some instances, however, the map 1104 produced by the robot 102 may contain large errors, thereby producing a combined score above the threshold required by the first the map analysis 1106. Accordingly, the map 1104 is provided to a parameterization block 1108, which produces a plurality of versions of the map 1104. The plurality of versions may each individually perform different optimizations and/or consider different sensory data with varying degrees of weight. For example, the map 1104 produced by the robot 102 may serve as a first map version. The same sensory data used to produce the map 1104 may be again processed without, e.g., gyroscopic data to produce a second map version. A third map version may be produced by adding additional artificial noise to one or more LiDAR sensor data. A fourth version may be produced without considering loop closures, or with loop closure consideration if the first map was produced without loop closures being considered. A fifth version may include or exclude the use of feature matching during map construction, which comprises the process of identifying a feature or object at multiple times or positions and inferring a location of the robot 102 from the position of the known object (assuming the object is static). These and other parameterizations of the computer readable map are considered without limitation, wherein one may produce one or more map versions by individually adjusting, removing, or adding optimization parameters during map construction. Preferably, the more map versions produced increases the likelihood of at least one of the maps being of sufficient quality for the robot 102 to utilize. Individually adding, removing or adjusting parameters of the map construction may isolate the failing optimization or noisy component. It is appreciated that various parameterized versions of a map may be further dependent on the specific mapping operations and/or specific sensor units of the robot 102, wherein the use of the three (3) scoring metrics of methods 700, 716, and/or 732 to evaluate the post construction result is not limited to any particular optimization methodology.

The plurality of map versions is provided again to a map analysis 1110 block which scores the plurality of map versions in accordance with methods 700, 716, and/or 732. In rare circumstances, all of the parameterized map versions may still fail the threshold score. Accordingly, the robot 102 is provided a communication 1116 indicating the map is not usable and should be re-trained or re-mapped. Alternatively, in some embodiments, prior maps which do pass the score threshold are utilized instead of the most recent map which does not pass the score threshold, wherein communication 1116 indicates to the robot 102 that it should use the prior versions. In some scenarios, such mapping failures typically arise from broken or faulty sensors and/or mechanical parts, wherein a robot 102 should be prevented from navigating with such faults and communications 1116 may cause the robot 102 to request maintenance before navigating again. If the robot 102 may operate both autonomously and manually, the controller 118 would only disable the autonomous functions. Depending on the risks of the environment and the degree to which the environment changes, a robot 102 operator may decide to revert to older map versions or preclude the robot 102 from operating as a safety precaution (e.g., a home cleaning robot likely does not pose a safety risk using an old map or single faulty sensor, as opposed to a robotic forklift in a warehouse).

Of the plurality of map versions, a subset of two or more may pass the scoring threshold. Accordingly, the remote system 1100 chooses the lowest score in block 1112 and provides the map with the corresponding lowest score to the robot 102 via communications 1118 for the robot 102 to utilize during navigation, reporting metrics, or other tasks.

In performing the map optimizations on maps that fail validation at block 1106 and subsequently producing a validated map after block 1110, a training pair is created. The training pair includes the initial poor-quality map 1104 which fails block 1106 and the final one or more maps which pass block 1110. Returning briefly to FIG. 8B, human intuition would immediately be able to recognize the collapsed object 808 is erroneous and that object 810 is skewed as a result of two aisles being merged. From the perspective of a neural network, however, such background context may be difficult to program in a widely applicable manner for a variety of complex environments. When provided with enough examples of diverged maps and their corrected variants, however, a network 900 may be configured to at least identify diverged maps. By providing the parameterizations which caused the diverged map to converge (e.g., ignoring gyro data, adding noise, removing loop closures, etc.) the network 900 may be further trained to identify likely corrections for the map based on trends in prior maps that were corrected. Employing a trained neural network 900, or other contemporary computer learning methodology, configured to identify diverged maps and offer likely parameterized solutions may improve the overall efficiency of the system 1110 in identifying and correcting diverged maps and could be deployed onto a robot 102 for use offline (i.e., while not connected to the remote system 1110). In other words, the trained model extracted from the weights of the trained neural network 900 may be utilized offline by a robot 102 to identify diverged maps without connectivity to the remote system 1100.

It will be recognized that while certain aspects of the disclosure are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed embodiments, or the order of performance of two or more steps permuted. All such variations are encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method comprising:

receiving, via at least one processor coupled to a robot, a computer readable map based on data collected by one or more sensors during navigation of a route by the robot;

calculating a scoring metric at each of a plurality of discrete locations along the route, wherein the scoring metric indicates quality of the computer readable map as a function of location of the robot on the map, wherein the scoring metric comprises at least two of: (i) a footprint score based on identifying occupied or undetected pixels within a boundary of a robot footprint superimposed at discrete locations, (ii) a scan consistency score based on simulating scans and determining magnitude of penetration of digital rays through occupied or unknown pixels, and (iii) a scan alignment score based on comparing sensor-measured translational differences with map-based distances between locations;

providing the scoring metric to a trained model configured to identify diverged maps based on patterns in the scoring metric as a function of location; and navigating the robot along the route using the computer readable map in response to determining the computer readable map is not diverged.

2. The method of claim 1, wherein one of the scoring metric comprises the footprint score, wherein the footprint score is determined based on:

superimposing a plurality of footprints of the robot at discrete locations along the route;

determining that one or more pixels including only occupied pixels or undetected pixels lie within a respective boundary of the plurality of footprints; and determining the footprint score based on the distance of the one or more pixels from the boundary, wherein an individual pixel of the one or more pixels contribute a value to the footprint score proportional to their distance to the boundary.

3. The method of claim 1, wherein one of the scoring metric includes the scan consistency score, the scan consistency score is determined based on:

simulating a scan taken by one or more sensors at a plurality of discrete locations along the route, the scan includes a plurality of distance measurements between the one or more sensors and objects taken at a plurality of angles, the simulating of the scan comprises extending digital rays representing the distance measurements for the plurality of angles;

determining a magnitude of penetration of the digital rays through occupied pixels or unknown pixels on the computer readable map; and determining a scan consistency score for each node along the route based on the magnitude of penetration at each node.

4. The method of claim 1, wherein one of the scoring metric includes the scan alignment score, the scan alignment score is determined based on:

selecting a first location along the route and a plurality of other discrete locations proximate to the first location;

computing a first translational difference between the first location and each of the plurality of other discrete locations using data from one or both of LiDAR sensors and odometry IMUs; and determining the scan alignment score based on a difference between the first translational difference and a second translational distance, the second translational distance corresponding to the distance between the first location and the plurality of other discrete locations on the map.

5. The method of claim 4, further comprising:

projecting a scan at a second plurality of locations, each one of the second plurality of locations corresponds to the first translational difference corresponding to the plurality of other discrete locations; and determining free space overlap between the scan taken at the first location and each one of the second plurality of locations, wherein non-overlapping free space increases the scan alignment score.

6. The method of claim 1, further comprising scan matching, wherein scan matching comprises the at least one processor determining a transformation minimizing spatial discrepancies between nearest neighboring points of two successive scans.

7. A robotic system, comprising:

at least one processor coupled to a robot configured to execute computer readable instructions to:

receive a computer readable map based on data collected by one or more sensors during navigation of a route by the robotic system;

calculate a scoring metric at each of a plurality of discrete locations along the route, wherein the scoring metric indicates quality of the computer readable map as a function of location on the map, wherein the scoring metric comprises at least two of: (i) a footprint score based on identifying occupied or undetected pixels within a boundary of a robot footprint superimposed at discrete locations, (ii) a scan consistency score based on simulating scans and determining magnitude of penetration of digital rays through occupied or unknown pixels, and (iii) a scan alignment score based on comparing sensor-measured translational differences with map-based distances between locations;

provide the scoring metric to a trained model configured to identify diverged maps based on patterns in the scoring metric as a function of location; and navigate the robot along the route using the computer readable map in response to determining the computer readable map is not diverged.

8. The robotic system of claim 7, wherein one of the scoring metric includes the footprint score, wherein the footprint score is determined based on the at least one processor:

superimposing a plurality of footprints of the robot at discrete locations along the route;

determining that one or more pixels including only occupied pixels or undetected pixels lie within a respective boundary of the plurality of footprints; and determining the footprint score based on the distance of the one or more pixels from the boundary, wherein individual pixels of the one or more pixels contribute a value to the footprint score proportional to their distance to the boundary.

9. The robotic system of claim 7, wherein one of the scoring metric includes the scan consistency score, wherein the scan consistency score is determined based on the at least one processor:

simulating a scan taken by one or more sensors at a plurality of discrete locations along the route, the scan includes a plurality of distance measurements between the one or more sensors and objects taken at a plurality of angles, the simulating of the scan comprises extending digital rays representing the distance measurements for the plurality of angles;

determining a magnitude of penetration of the digital rays through occupied pixels or unknown pixels on the computer readable map; and determining a scan consistency score for each node along the route based on the magnitude of penetration at each node.

10. The robotic system of claim 7, wherein one of the scoring metric includes the scan alignment score, wherein the scan alignment score is determined based on the at least one processor:

selecting a first location along the route and a plurality of other discrete locations proximate to the first location;

computing a first translational difference between the first location and each of the plurality of other discrete locations using data from one or both of LiDAR sensors and odometry IMUs; and determining the scan alignment score based on a difference between the first translational difference and a second translational distance, the second translational distance corresponding to the distance between the first location and the plurality of other discrete locations on the map.

11. The robotic system of claim 10, wherein the at least one processor is further configured to:

project a scan at a second plurality of locations, each one of the second plurality of locations corresponds to the first translational difference corresponding to the plurality of other discrete locations; and determine free space overlap between the scan taken at the first location and each one of the second plurality of locations, wherein non-overlapping free space increases the scan alignment score.

12. The robotic system of claim 7, wherein the at least one processor coupled to the robot executes computer readable instructions to perform scan matching, wherein scan matching comprises the at least one processor determining a transformation minimizing spatial discrepancies between nearest neighboring points of two successive scans.

13. A non-transitory computer readable storage medium having a plurality of instructions stored thereon which, when executed by at least one processor coupled to a robot, configure the at least one processor to:

receive a computer readable map based on data collected by one or more sensors during navigation of a route by the robot;

calculate a scoring metric at each of a plurality of discrete locations along the route, wherein the scoring metric indicates quality of the computer readable map as a function of location on the map, wherein the scoring metric comprises at least two of: (i) a footprint score based on identifying occupied or undetected pixels within a boundary of a robot footprint superimposed at discrete locations, (ii) a scan consistency score based on simulating scans and determining magnitude of penetration of digital rays through occupied or unknown pixels, and (iii) a scan alignment score based on comparing sensor-measured translational differences with map-based distances between locations;

provide the scoring metric to a trained model configured to identify diverged maps based on patterns in the scoring metric as a function of location; and navigate the robot along the route using the computer readable map in response to determining the computer readable map is not diverged.

14. The non-transitory computer readable storage medium of claim 13, wherein one of the scoring metric includes the footprint score, wherein the footprint score is determined based on the at least one processor:

superimposing a plurality of footprints of the robot at discrete locations along the route;

determining that one or more pixels including only occupied pixels or undetected pixels lie within a respective boundary of the plurality of footprints; and determining the footprint score based on the distance of the one or more pixels from the boundary, wherein individual pixels of the one or more pixels contribute a value to the footprint score proportional to their distance to the boundary.

15. The non-transitory computer readable storage medium of claim 13, wherein one of the scoring metric includes the scan consistency score, wherein the scan consistency score is determined based on the at least one processor:

simulating a scan taken by one or more sensors at a plurality of discrete locations along the route, the scan includes a plurality of distance measurements between the one or more sensors and objects taken at a plurality of angles, the simulating of the scan comprises extending digital rays representing the distance measurements for the plurality of angles;

determining a magnitude of penetration of the digital rays through occupied pixels or unknown pixels on the computer readable map; and determining a scan consistency score for each node along the route based on the magnitude of penetration at each node.

16. The non-transitory computer readable storage medium of claim 13, wherein one of the scoring metric includes the scan alignment score, wherein the scan alignment score is determined based on the at least one processor:

selecting a first location along the route and a plurality of other discrete locations proximate to the first location;

computing a first translational difference between the first location and each of the plurality of other discrete locations using data from one or both of LiDAR sensors and odometry IMUs; and determining the scan alignment score based on a difference between the first translational difference and a second translational distance, the second translational distance corresponding to the distance between the first location and the plurality of other discrete locations on the map.

17. The non-transitory computer readable storage medium of claim 16, wherein the at least one processor is further configured to:

project a scan at a second plurality of locations, each one of the second plurality of locations corresponds to the first translational difference corresponding to the plurality of other discrete locations; and determine free space overlap between the scan taken at the first location and each one of the second plurality of locations, wherein non-overlapping free space increases the scan alignment score.

18. The non-transitory computer readable storage medium of claim 13, wherein the at least one processor is further configured to perform scan matching, wherein scan matching comprises the at least one processor determining a transformation minimizing spatial discrepancies between nearest neighboring points of two successive scans.

* * * * *